United States Patent [19]

Takahashi et al.

[11] Patent Number: 5,544,835
[45] Date of Patent: Aug. 13, 1996

[54] PHOTOGRAPHIC FILM CASSETTE, AND APPARATUS AND METHOD OF LOADING AND REMOVING PHOTOGRAPHIC FILM IN ASSOCIATION WITH THE CASSETTE

[75] Inventors: Koichi Takahashi; Tetsuya Takatori; Haruo Ichikawa; Akimasa Kaya; Tomoyuki Takahashi, all of Kanagawa, Japan

[73] Assignee: Fuji Photo Film Co., Ltd., Kanagawa, Japan

[21] Appl. No.: 467,836

[22] Filed: Jun. 6, 1995

Related U.S. Application Data

[62] Division of Ser. No. 91,626, Jul. 15, 1993.

[30] Foreign Application Priority Data

Jul. 15, 1992 [JP] Japan .................... 4-212135

[51] Int. Cl.⁶ .................... B65H 75/28; G03B 17/26
[52] U.S. Cl. .................... 242/348.1
[58] Field of Search .................... 242/348.1, 332.8, 242/584.1, 587.1; 354/275

[56] References Cited

U.S. PATENT DOCUMENTS

| | | |
|---|---|---|
| 3,586,258 | 6/1971 | Horlezeder . |
| 3,604,651 | 9/1971 | Ohno .................... 242/584.1 |
| 3,910,516 | 10/1975 | Hoffacker et al. .................... 549/475 |
| 4,080,711 | 3/1978 | Kawada et al. .................... 514/18 |
| 4,506,843 | 3/1985 | Luhrig et al. .................... 242/584.1 |
| 4,614,019 | 9/1986 | Shimizu et al. .................... 560/35 |
| 4,834,306 | 5/1989 | Robertson et al. .................... 514/399 |
| 4,846,418 | 7/1989 | Fairman . |
| 4,852,821 | 8/1989 | Harris et al. .................... 242/584.1 |
| 4,978,084 | 12/1990 | Harris et al. .................... 242/584.1 |
| 5,049,912 | 9/1991 | Pagano et al. . |
| 5,188,306 | 2/1993 | Kataoka et al. . |
| 5,360,183 | 11/1994 | Takahashi et al. . |

FOREIGN PATENT DOCUMENTS

| | | |
|---|---|---|
| 0406815 | 1/1991 | European Pat. Off. . |
| 1075991 | 10/1954 | France . |
| 5277723 | 12/1975 | Japan . |

*Primary Examiner*—John M. Jillions
*Attorney, Agent, or Firm*—Sughrue, Mion, Zinn, Macpeak & Seas

[57] ABSTRACT

A cassette for containing photographic film has a spool which is provided with retaining claws for retaining a trailer of the photographic film. A cassette port communicates the spool chamber to the outside. To load the photographic film into a cassette, a loading apparatus picks up the trailer with an inserter jig. The inserter jig is passed through the passage port, and is brought to the spool so as to insert the trailer into the cassette shell. The trailer is retained on the spool with the retaining claws. The inserter jig is then drawn out of the cassette shell. Then the spool is rotated in order to wind the photographic film around the spool, fully into the cassette shell. To remove exposed photographic film from such a cassette, the photographic film is drawn and unwound. A separator jig, as passed through the passage port, is brought to the spool. The trailer is released from retention on the retaining claws by use of the separator jig. Then the photographic film is drawn out so as to separate the trailer from the spool.

2 Claims, 26 Drawing Sheets

PHOTOGRAPHIC FILM CASSETTE, AND APPARATUS AND METHOD OF LOADING AND REMOVING PHOTOGRAPHIC FILM IN ASSOCIATION WITH THE CASSETTE

This is a division of application Ser. No. 08/091,626 filed Jul. 15, 1993.

BACKGROUND OF THE INVENTION

1. Field of the Invention

The present invention relates to a photographic film cassette, more specifically to an apparatus and method for loading photographic film into the cassette and removing photographic film from the cassette.

2. Description of the Related Art

Photographic film of the 135 type, contained in a cassette, is among the most popular formats of photographic film. A known 135 photographic film cassette has a cassette shell constituted of a cylindrical body and formed in a thin metal sheet two caps, fitted thereon. The cassette has a spool contained in the cassette shell on which photographic film is wound in a form of a roll. To assemble this photographic film cassette, several methods are known. For example, U.S. Pat. No. 4,614,019 (corresponding to Japanese Patent Publication No. 2-691) discloses a process of winding the photographic film on the spool, and then assembling the cassette in a darkroom; U.S. Pat. No. 4,080,711 (corresponding to Japanese Patent Publication No. 60-48748) discloses a process of bringing the assembled cassette shell into the darkroom, disassembling the cassette shell for insertion of the photographic film, inserting the photographic film wound on the spool, and then assembling the cassette shell.

U.S. Pat. No. 3,910,516 (corresponding to Japanese Patent Laid-open Publication No. 49-107732) and Japanese Patent Laid-open Publication No. 52-77723 also disclose a photographic film cassette producing method wherein an empty spool is loaded by inserting a tongue-like guide plate into a photographic film passage port formed in the cassette, then inserting a trailer of photographic film into the cassette while it is guided along the guide plate. The trailer is then fixed to the spool and the spool is rotated to wind the photographic film up into the cassette.

U.S. Pat. No. 4,834,306, U.S. Pat. No. 4,846,418 and European Publication EP-A2 0 406 815 (corresponding to Japanese Patent Laid-open Publication No. 3-37645), each disclose a photographic film cassette in which a cassette shell is constituted of parts formed from resin, and rotation of a spool causes a leader of the photographic film to exit to the outside of the cassette. Such a leader-advancing cassette is different from photographic film cassettes conventionally in use because the leader of the photographic film is fully contained within the cassette both before exposure and after exposure. Such a cassette is advantageous in that the photographic film is reliably protected from accidental exposure to ambient light, and in that the cassette is easily handled.

Generally, a leader advancing cassette including elements not utilized in conventional cassettes. For example, the cassette shell of such a device can incorporate a light-shielding shutter member arranged openably in the photographic film passage port for projecting the inside from ambient light, or a visual indicator member arranged to appear externally for indicating the exposed condition of the photographic film. However, production of such a leader-advancing cassette has many inherent problems due to the increase in the number of the parts. Particularly, the assembling operation is difficult and must be accomplished in the darkroom. Accordingly, problems arise in inspection, maintenance, and safety during the manufacturing operation.

When a leader-advancing cassette is produced by above-mentioned method disclosed in U.S. Pat. No. 3,910,516 and Japanese Patent Laid-open Publication No. 52-77723, although the guide plate is first inserted for inserting the trailer into the cassette, there is strong possibility that the trailer in the course would become flexed or bent before reaching the spool and thus is not positively fixed to the spool.

Also, after effecting exposure on the photographic film, the exposed photographic film is removed from the cassette for a developing process. Although the photographic film is drawn out of the cassette, the photographic film cannot be separated from the spool because the trailer of the photographic film is fixedly retained on the spool. To remove the photographic film from the cassette, it is conventional to cut off the photographic film while leaving a portion of the trailer within the cassette.

Recently, recycling photographic film cassettes has become popular. The recycling includes: reusing parts after the first use; and remolding new resinous parts by melting the use resinous parts. It is, however, difficult to reuse such a used cassette, because the trailing portion of the photographic film is irremovably attached on the spool. To remold a resinous cassette from a cassette containing a small portion of the photographic film degrades the quality of the resin to be molded, because the small portion of the photographic film is mixed in the resin. Therefore the cassette, after separation of the photographic film, must be disassembled to remove the small portion of the photographic film from the spool. Also, the small portion of the film must then be properly disposed of.

SUMMARY OF THE INVENTION

In view of the foregoing problems, an object of the present invention is to provide an apparatus and method for loading photographic film into and removing photographic film from a leader-advancing cassette with high efficiency and reliability.

Another object of the present invention is to provide an apparatus and method for loading photographic film into a cassette and removing photographic film from a cassette wherein recycling of the parts of the cassette is facilitated.

Still another object of the present invention is to provide a photographic film cassette which facilitates loading of photographic film into the cassette and removing photographic film from the cassette.

In order to achieve the above and other objects and advantages of this invention, a holding device holds the cassette shell in a predetermined orientation to position the passage port thereof in a predetermined direction. An inserter member inserts the trailer into the cassette shell. The inserter member moves between an inserting position, where the inserter member close to the spool, and a standby position, where the inserter member exits from the passage port. A pick-up end portion is formed on the inserter member for picking up the trailer, to mount the trailer on the spool when the inserter member moves to the inserting position. A spool rotating device then rotates the spool in order to wind the photographic film around the spool.

In operation, the trailer is picked up with an inserted jig. The inserter jig is passed through the passage port to approach the spool, to insert the trailer into the cassette shell.

The trailer is retained on the spool with the retaining structure. The inserter jig is then drawn out of the cassette shell. Then the spool is rotated in order to wind the photographic film around the spool, and to wind the photographic film up into the cassette shell.

In accordance with the present invention, photographic film can be loaded into a cassette, with high efficiency and reliability, even in a cassette in which rotation of the spool exits a leader of the photographic film to the outside of the cassette.

To remove exposed photographic film from a cassette, a holding device holds the cassette shell in a predetermined orientation to position the passage port thereof in a predetermined direction. A drawing device draws the photographic film until the photographic film is substantially unwound so that one convolution or less remains wound on the spool. A separator member then separates the trailer from the spool. The separator member moves between an inserting position, where the separator member is close to the spool, and a standby position, where the separator member exits from the passage port. The separator member is moved to the inserting position after the drawing device has been stopped and releases the trailer from retention on the retaining structure while leaving the spool in the cassette shell.

In operation, the photographic film is drawn until it is unwound so that one convolution or less remains wound on the spool. A separator jig is brought into the cassette shell up to the spool, via the passage port. The trailer is released from retention on the retaining structure by use of the separator jig. Then the photographic film is drawn out to separate the photographic film from the spool. Accordingly, the photographic film can be completely removed from a cassette the parts of the cassette can thus be easily recycled.

The cassette includes at least one retaining hole formed in the trailer. A slot is formed in the spool and extends in an axial direction of the spool for receiving the trailer. At least one retaining claw projects from inside the slot to be fitted in the retaining hole, thereby retaining the trailer on the spool. At least one preventive projection projects from inside the slot in a direction opposite to the retaining claw, for preventing the film trailer from slipping off of the retaining claw. A center of the slot does not coincide with a rotational axis of the spool. The cassette of the invention can be easily loaded with photographic film and the photographic film can be easily removed from the cassette.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
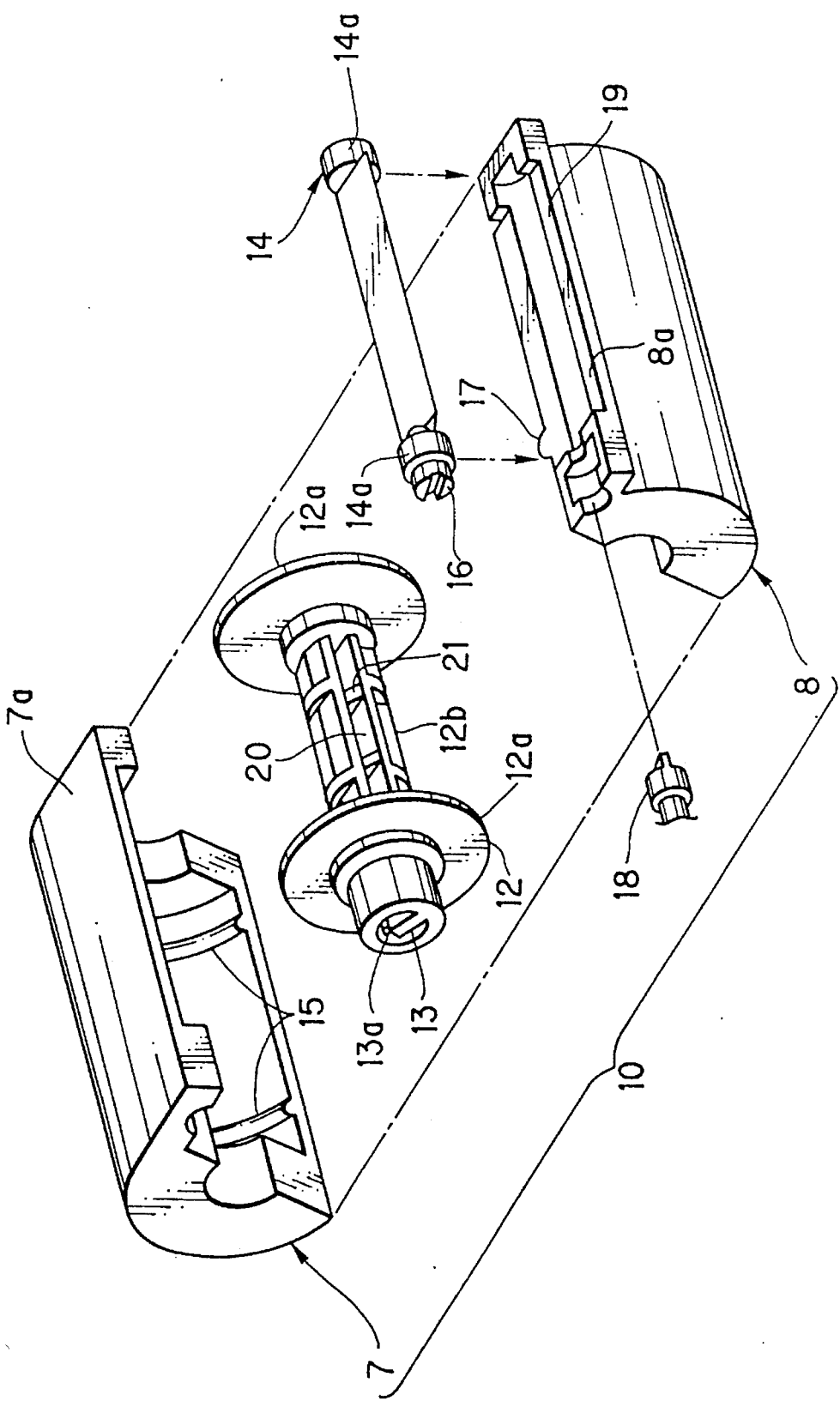
FIG. 1 is an exploded perspective view illustrating a preferred embodiment of the film cassette.
Figure 2:
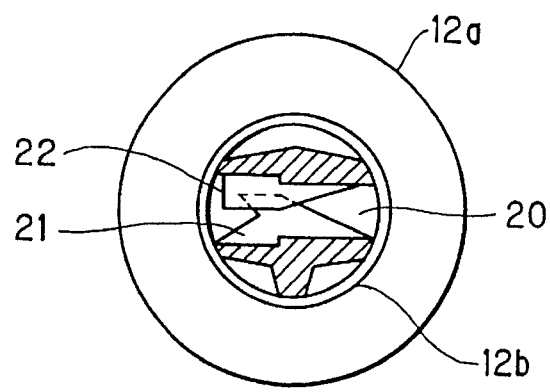
FIG. 2 is a cross section illustrating a spool incorporated in the cassette in FIG. 1.
Figure 3:
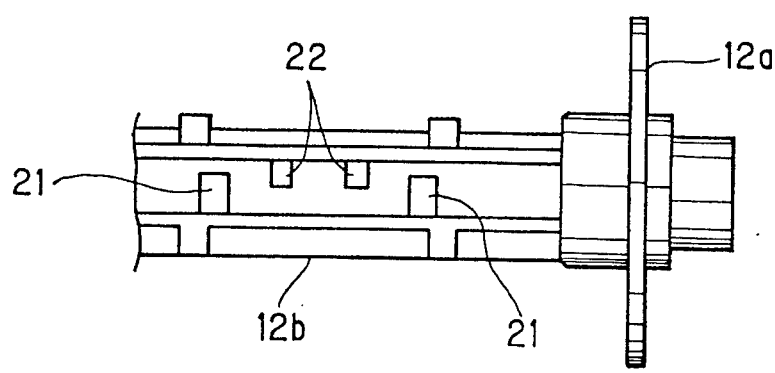
FIG. 3 is a front elevation illustrating the spool in FIG. 2.
Figure 4:
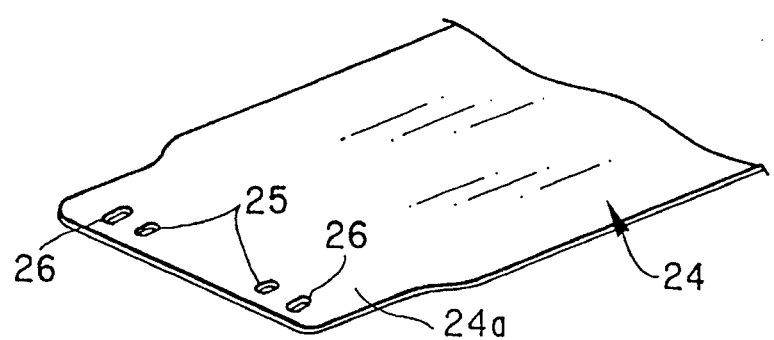
FIG. 4 is an explanatory view illustrating a shape of a trailer of the photographic film as contained in the cassette in FIG. 1.

FIGS. 1 to 3 illustrate a photographic film cassette of a preferred embodiment. A spool 12 is contained in a cassette shell 10 constituted of a pair of shell halves 7 and 8 molded from resin. Ridges 15 are formed on the inside of the shell halves 7 and 8. When photographic film 24 (see FIG. 4) is wound around the spool 12 and contained within a spool chamber between the shell halves 7 and 8, the ridges 15 are in contact with the outermost turn of the photographic film 24 to prevent the roll of the photographic film 24 from loosening. When the spool 12 is rotated in the direction to unwind the film 24, clockwise in FIG. 1, the roll of the photographic film is also rotated clockwise. A separator claw 17 is formed inside of shell half 8. During rotation of the roll of the photographic film 24, a leading end of the photographic film abuts on the separator claw 17, which separates the leading end from the roll of the film.

Port walls 7a and 8a are formed on the shell halves 7 and 8. When the shell halves 7 and 8 are joined together, the port walls 7a and 8a define a photographic film passage port 19. A shutter plate 14 is supported by the port walls 7a and 8a. Both ends of the shutter 14 are provided with rotary shaft portions 14a to be borne between the port walls 7a and 8a, so that the shutter 14 is rotatable about an axis which is parallel to the spool 12. An end of the shaft portions 14a has a key 16, which extends through a hole formed in the cassette shell 10. When an opener member 18 is fitted on the key 16 and rotates the key 16, the shutter 14 is rotated between positions of blocking and opening the passage port 16.

A pair of flanges 12a are formed on the spool 12. The photographic film is wound on a core 12b of the spool 12 between the flanges 12a. Both ends of the spool 12 extend through faces of the cassette shell 10, and are provided with keys 13. The keys 13 are used for engagement with a drive member for rotating the spool 12 in a known manner. A notch 13a is formed in one of the keys 13.

A slot 20 is formed in the core 12b. Inside the slot 20 are arranged two retaining claws 21 and two slip-preventive ridges 22. The ridges 22 extend in the direction opposite to, and are disposed between, the retaining claws 21 (see FIG. 3). The right side of the slot 20 is adapted to receive a trailer 24a of the photographic film 24 illustrated in FIG. 4.

The trailer 24a of the photographic film 24 has two retaining holes 25 formed therein, which are engageable with the retaining claws 21. The ridges 22 press the trailer 24a in the direction opposite to projecting of the retaining claws 21, so that the holes 25 are maintained in engagement with the retaining claws 21, even if a force tending to pull the photographic film 24 from the slot 20 should be applied to the trailer 24a. The trailer 24a is further provided with two pick-up holes 26 at an interval which is wider than that between the retaining holes 25. The pick-up holes 26 are used for inserting the trailer 24a into the slot 20.

Figure 5:
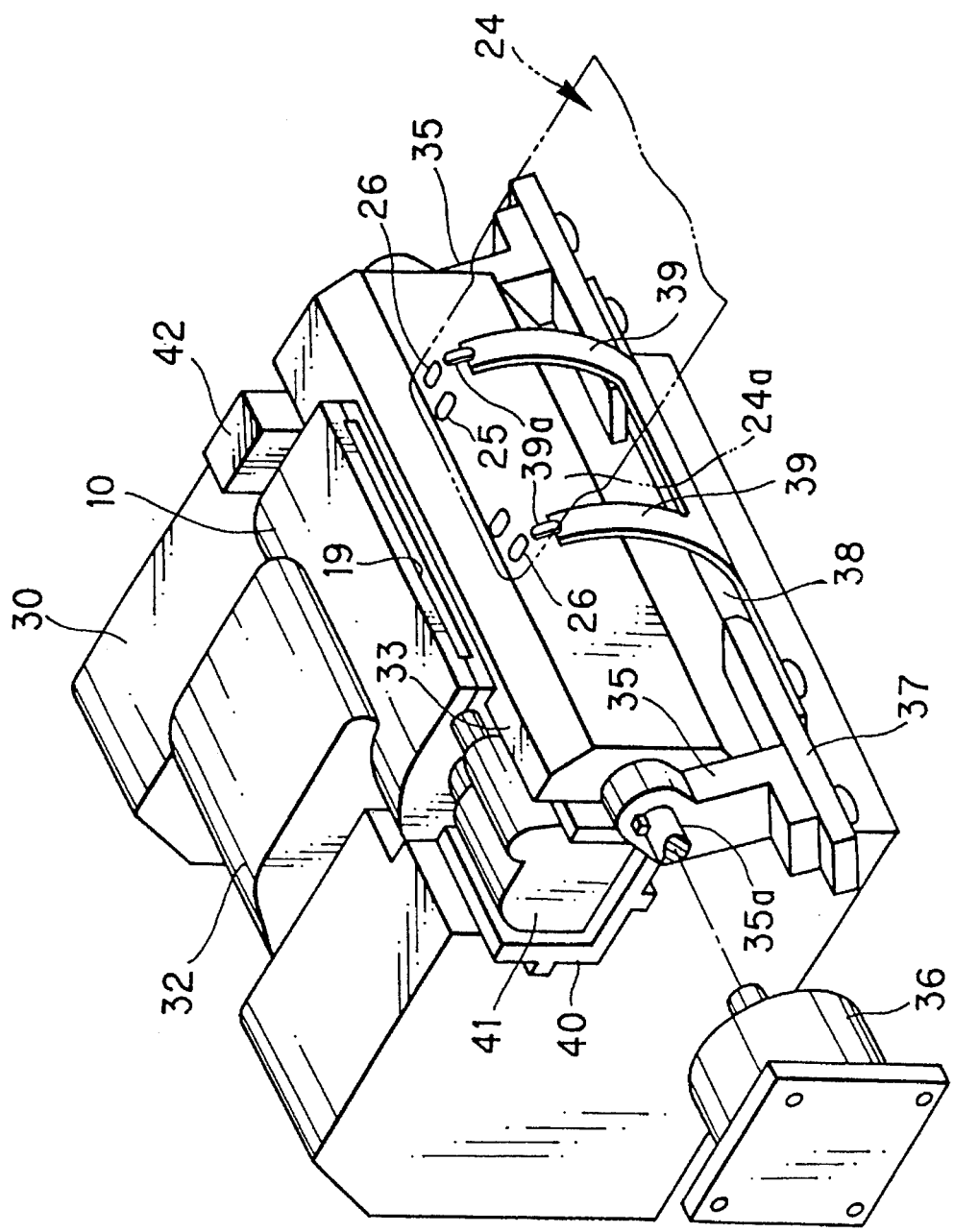
FIG. 5 is a perspective view illustrating a novel apparatus for loading the photographic film according to a preferred embodiment.
Figure 6:
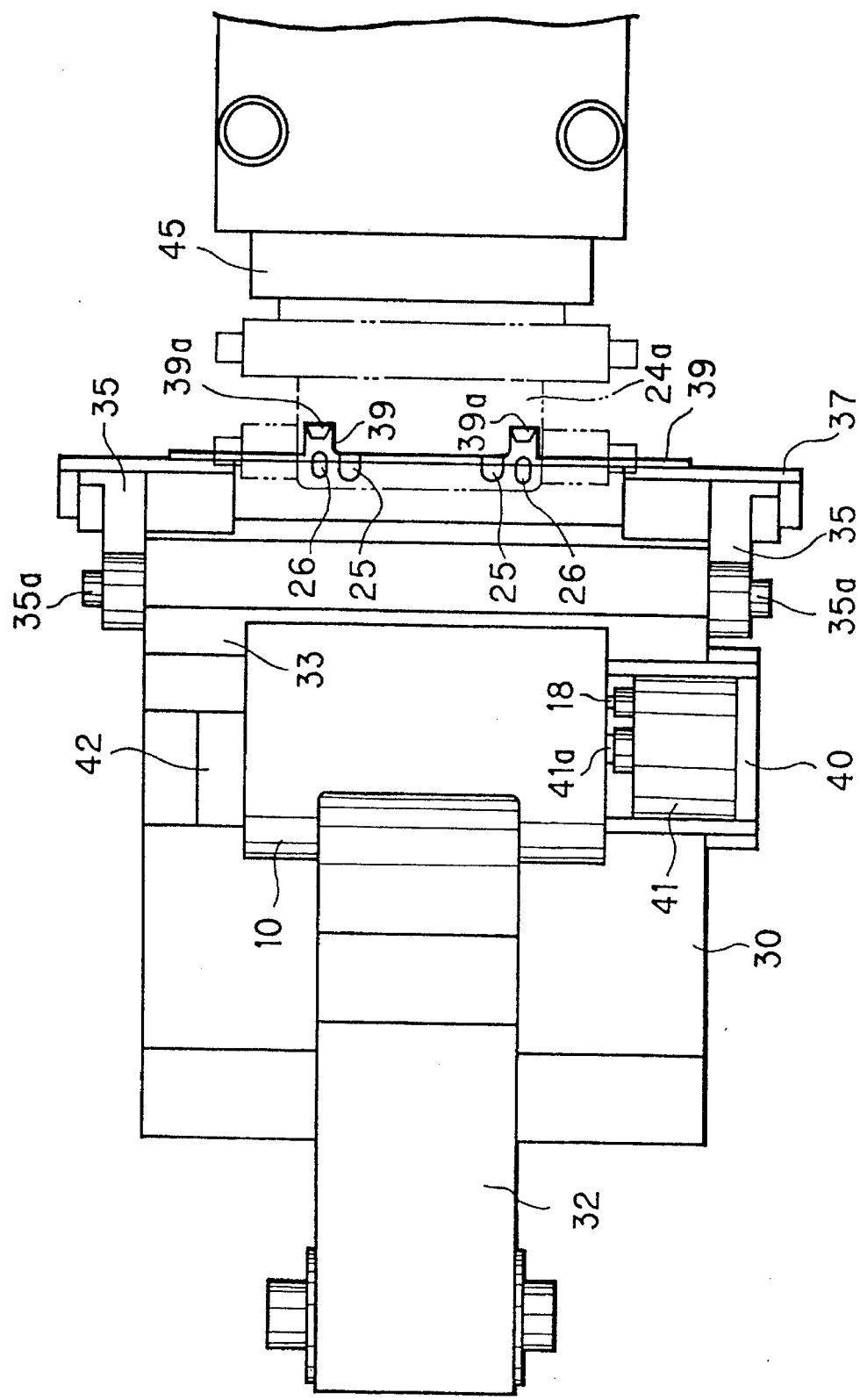
FIG. 6 is a plan view illustrating the loading apparatus in FIG. 5.
Figure 7:
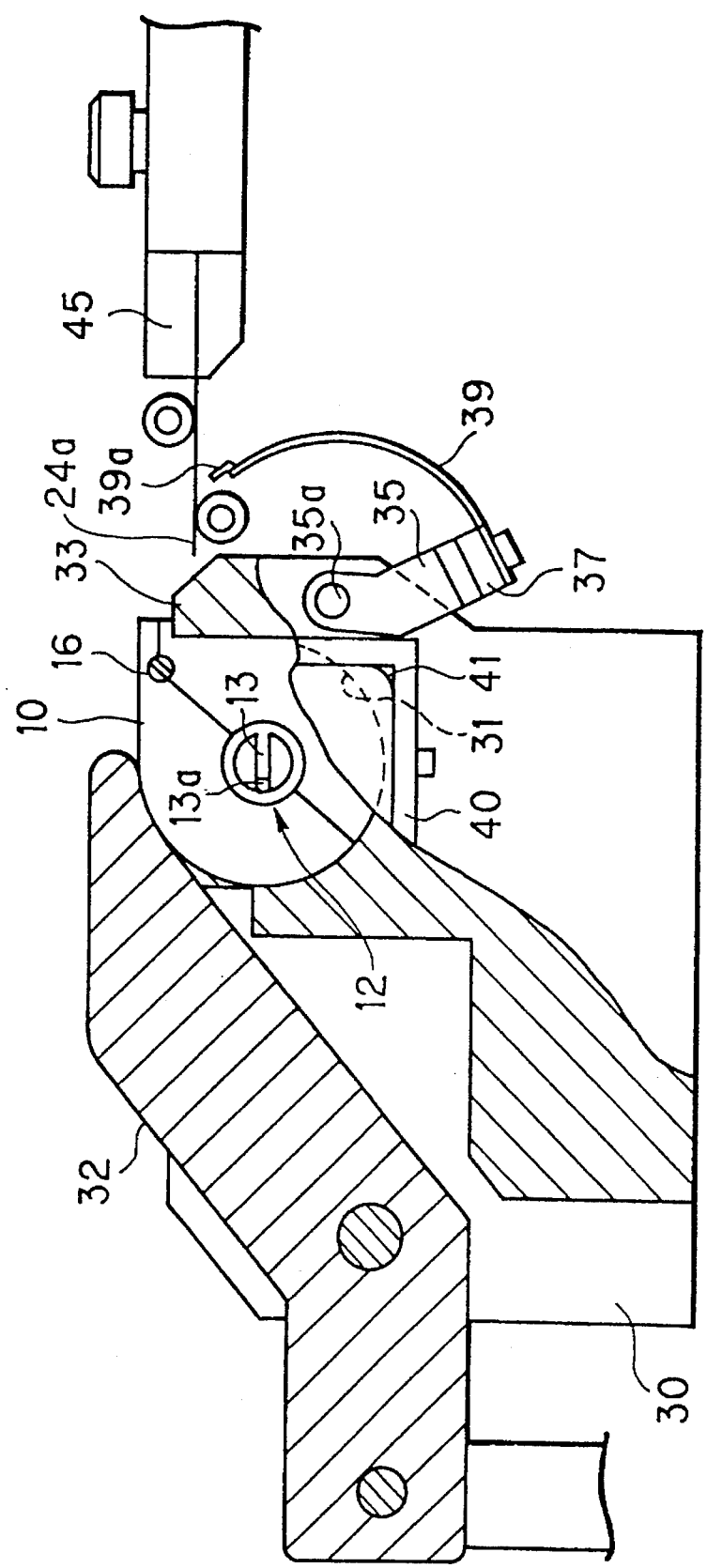
FIG. 7 is a side elevation in partial section, illustrating the apparatus in FIG. 5.

FIGS. 5 to 7 illustrate an apparatus, according to a preferred embodiment, for inserting photographic film into the cassette. The apparatus is adapted for fixing the photographic film 24 to the spool 12 and winding it thereabout, after assembling the spool 12 and the shutter 14 in the cassette shell 10 consisting of the shell halves 7 and 8. A base 30 is provided with a holder 31 shaped in correspondence with the periphery of the cassette shell 10 for receiving and supporting the cassette shell 10. A lever 32 is journaled on the base 30 and driven by a hydraulic cylinder device (not shown) through a linkage mechanism (not shown). When the cassette shell 10 is supplied into the holder 31, the lever 32 pivots to press and hold the cassette shell 10 in the holder 31.

With the cassette shell 10 pressed by the lever 32, the cassette shell 10 is oriented by in a predetermined manner by virtue of engagement between port wall 8a and a positioning edge 33. Both lateral faces of the base 30 have on arm 35 journaled thereon about a shaft 35a. The arms 35 are driven by a stepping motor 36. The arms 35 are connected to a connecting plate 37, which supports a clawed inserter jig 39 on the arms 35. The inserter jig 39 is arcuate, is formed on flexible thin metal, and is provided with two projections having pick-up claws 39a at a distal end thereof.

A slide frame 40 is arranged on one lateral face of the base 30 to be slidable toward, and away from, an end face of the cassette shell 10, and is adapted to support a drive unit 41. The drive until 41 drives the spool 12 and the shutter 14 in a rotatable manner, and includes a fork 41a for engagement with the key 13 of the spool 12, a motor (not shown) for driving the fork, an opener jig 18 for engagement with the key 16, and a motor (not shown) for driving the opener 18 (see FIG. 6). The slide frame 40 is in the retracted position before the cassette shell 10 is set in the holder 31, and is moved to the drive position after setting the cassette shell 10 in the predetermined orientation. The fork 41a for spool 12 and the opener 18 for the shutter 14 are respectively engaged with the keys 13 and 16 which both appear through the face of the cassette shell 10.

The other face of the base 30 has a photo sensor 42 disposed thereon, which detects the position of the notch 13a in the spool 12, to determine the rotational position of the spool 12 with reference to the predetermined orientation for positioning the slot 20. Note that, though not shown in FIGS. 5–7, the spool end facing the photo sensor 42 is provided with the key 13 and the notch 13a.

A feeder 45 of the photographic film 24 is arranged to face the base 30 (see FIGS. 6 and 7). The feeder 45 is connected to a device for supplying the photographic film 24, and, each time one strip of photographic film is cut off and contained into the cassette shell, the feeder 45 holds next trailer 24a in standby position. When the trailer 24a is protruded from the feeder 45 on standby, the holes 26 are positioned in a predetermined manner relative to the pick-up claws 39a.

Figure 8:
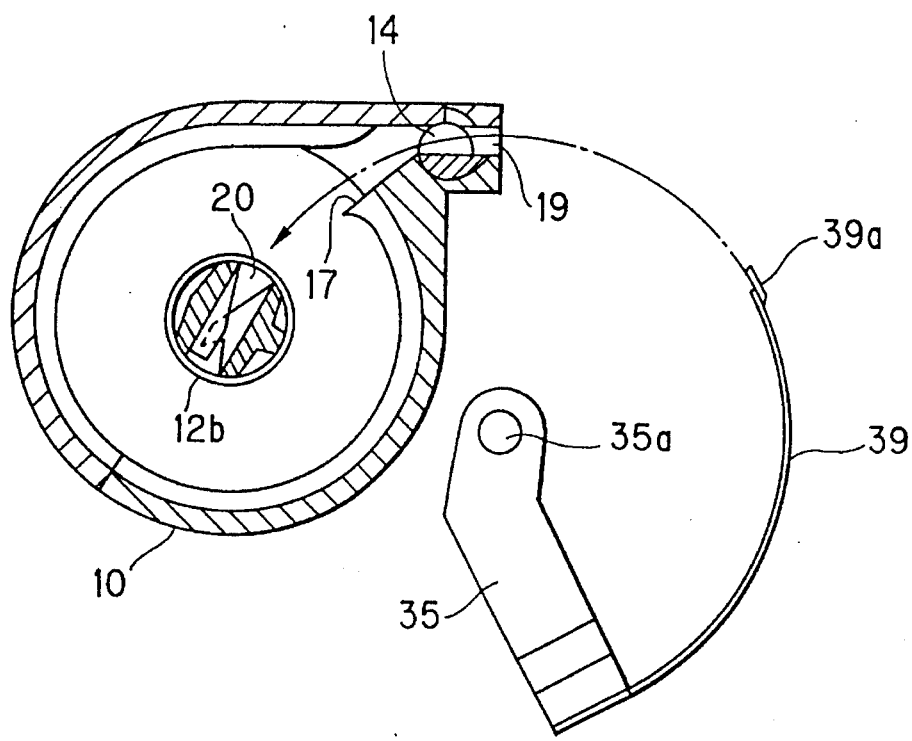
FIG. 8 is an explanatory view illustrating operation of the apparatus in FIG. 5.

FIG. 8 illustrates relative positions of the cassette shell 10 and the arm 35 while the cassette shell is positioned in the holder 31. The shaft 35a is substantially equal distinct from the axis of the core 12a, the passage port 19, and the claw 39a. When the arm 35 is rotated counterclockwise from the standby position in FIG. 8, the claw 39a is passed through the passage port 19 and eventually into the slot 20 within the core 12a. Note that the notch 13a is used for approximately setting the rotational orientation of the spool 12 for receiving the trailer 24a with known control devices, as illustrated in FIG. 8.

The operation of the inserting the photographic film 24 into the cassette shell 10 is described below. The cassette shell 10, as shown in FIG. 1, is assembled with the new spool 12 in an illuminated room, i.e., not in a darkroom. The empty cassette therefore can be assembled reliably and easily, together with the shutter 14 and other separate parts, such as an indicator member for unexposed and exposed states, and a regulating member for rotation of the spool. The cassette shells 7 and 8 are welded together firmly by ultrasonic welding.

The empty cassette into which the spool 12 and the cassette shell 10 are assembled is brought into darkroom, and set into the photographic film loading apparatus. To set the empty cassette, the lever 32 is in the open position and the slide frame 40 is retracted. With the cassette shell 10 set in the holder 31, the lever 32 is swung to the pressing position to hold the cassette shell 10 on the holder 31 and the edge 33 in the predetermined orientation. The slide frame 40 is next moved until the drive position of FIG. 6 wherein the fork 41a is engaged with the key 13 and the opener 18 is engaged with the key 16.

When the fork 41a and the opener 18 are firmly engaged with the respective keys 13 and 16, the drive unit 41 is actuated to drive the spool 12 in the winding direction, namely counterclockwise in FIG. 7. The spool 12 is thus rotated. The photo sensor 42 monitors the position of the notch 13a at the key 13 and, when the notch 13a has come to the predetermined position, sends a stop signal to the drive unit 41. The spool 12 is then stopped to direct the entrance of the slot 20 in the core 12a to the passage port 19. Note that it is possible to regulate the spool 12 in the same rotational orientation beforehand during the transportation of the empty cassette into the holder 31. This eliminates the need for the photo sensor 42.

Figure 9:
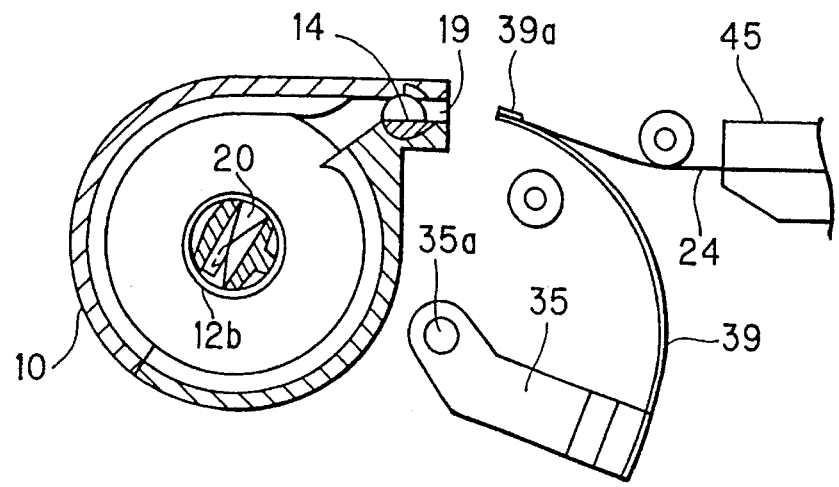
FIGS. 9 to 11 are explanatory views illustrating operation in the course of inserting and retaining the trailer on the spool.

The opener 18 is driven by the drive unit 41 to rotate the shutter 14 to open the passage port 19. The stepping motor 36 is then energized to drive the arm 35 to rotate through a predetermined angle. The inserter jig 39 rotates together with the arm 35, to engage the pick-up claws 39a with the holes 26 in the trailer 24a of the photographic film 24, as illustrated in FIG. 9. Further rotation of the arm 35 causes the pick-up claws 39a to pick up the trailer 24a, and pulls the photographic film 24 form the feeder 45.

Figure 12:
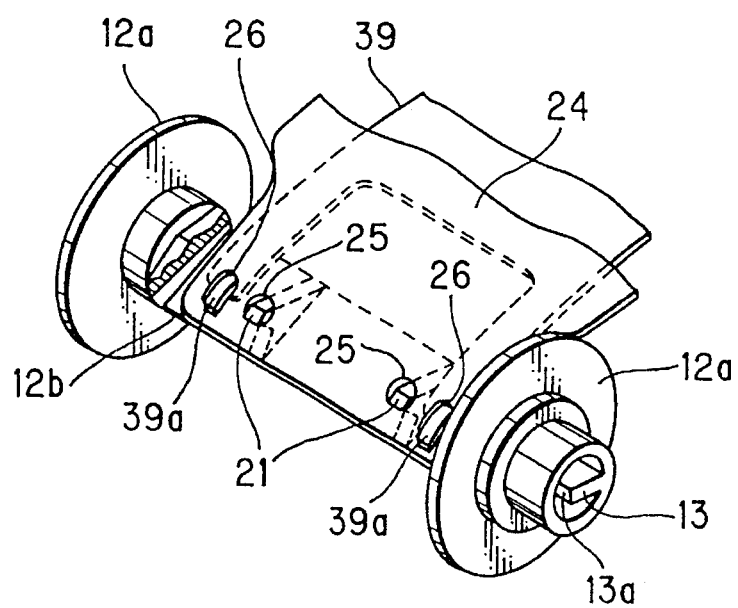
FIG. 12 is an explanatory view illustrating the trailer retained on the spool.
Figure 10:
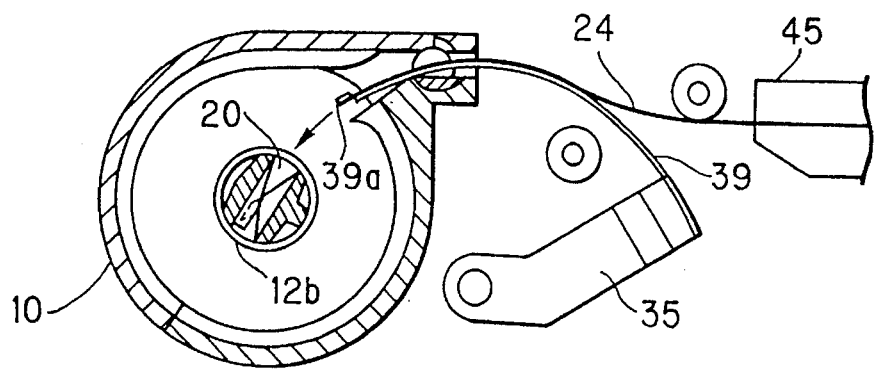
Figure 11:
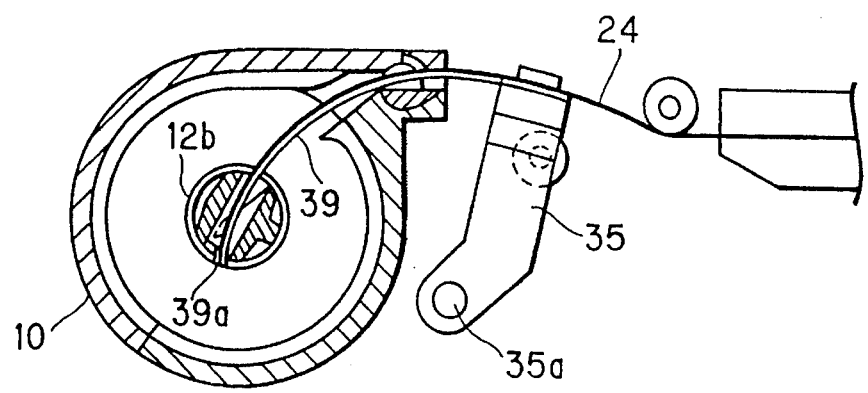

Continuing rotation of the arm 35 causes the pick-up claws 39a to pass through the passage port 19, with the trailer 24a, and into the cassette shell 10. The arm 35 having passed through the positions of FIG. 10 and then FIG. 11, the pick-up claws 39a are inserted into the slot 20 formed in the core 12b. In the course of the insertion of the pick-up claws 39a into the slot 20, the trailer 24a, as picked up by the pick-up claws 39a, is positioned between the retaining claws 21 and the ridges 22, to fit the retaining claws 21 into the holes 25, as illustrated in FIG. 12. The inserter jig 39 may rub on the inside walls of the slot 20, but is so flexible that the pick-up claws 39a can be passed fully through the slot 20, without great resistance to insertion of the jig 39 into the slot 20. Note that the upper wall of the slot 20 is omitted from FIG. 12 for the purpose of clarity.

Figure 13:
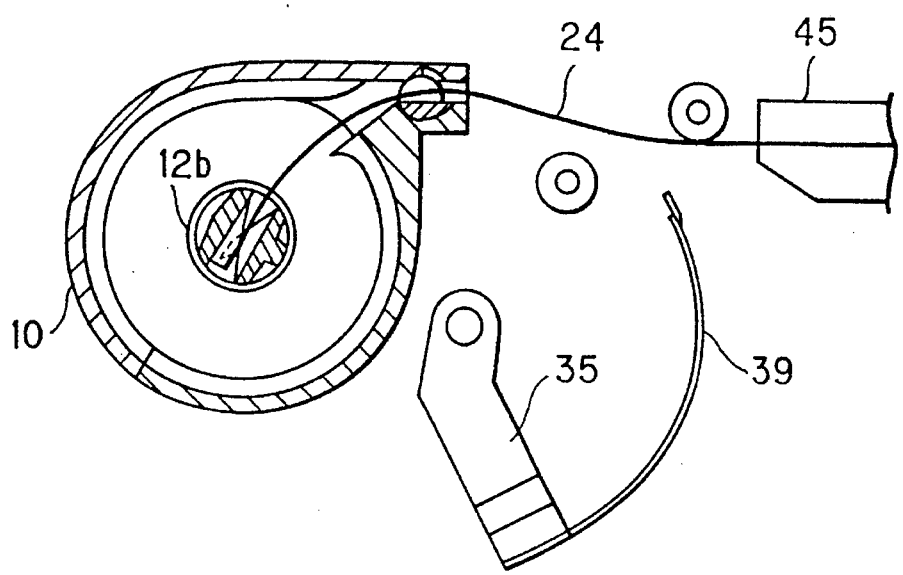
FIGS. 13 and 14 are explanatory views illustrating operation after retaining the trailer on the spool.

With the trailer 24a retained on the core 12b of the spool 12, the arm 35 rotates back to the standby position as illustrated in FIG. 13, while pulling the pick-up claws 39a out of the cassette shell 10. The retaining claws 21 are so shaped as to keep the photographic film 24 from moving in the direction toward the passage port 19. Once the holes 25 are retained on the retaining claws 21, the holes 25 are not disengaged from the slot 20 when the inserter jig 39 is pulled out of the slot 20. It is noted that, to remove the inserter jig 39 from the cassette, it is possible to rotate the spool 12 counterclockwise first, until the inserter jig 39 is pushed out of the slot 20. The arm 35 can then be rotated clockwise to pull the inserter jig 39 out of the cassette shell 10. This alternative operation is possible due to the flexible thin characteristic of the inserter jig 39.

Figure 14:
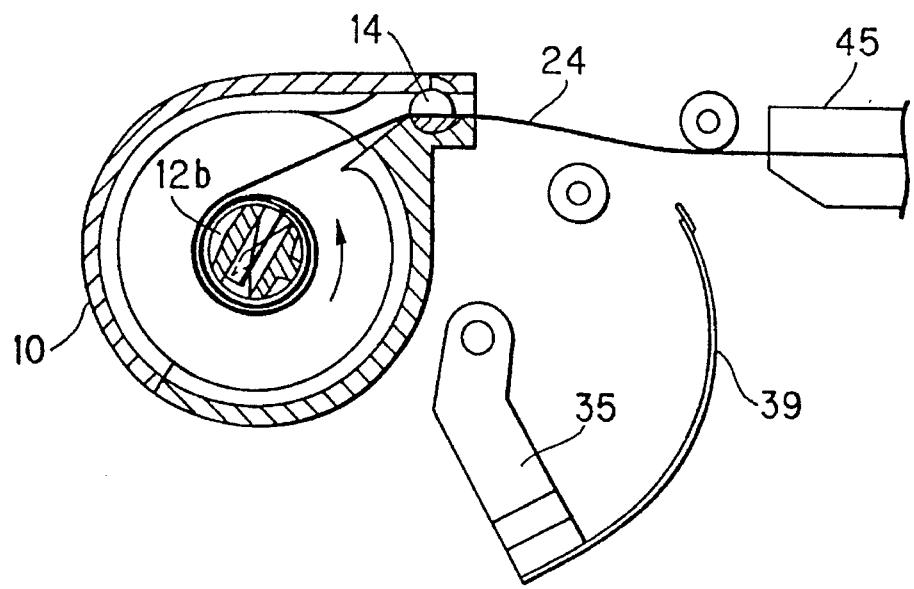

After the arm 39 is brought back to the standby position, the fork 41 of the drive unit 41 is driven to rotate the spool 12 in the counterclockwise direction of the arrow illustrated in FIG. 14. The photographic film 24 is thus wound up around the core 12b of the spool 12. The photographic film 24 is further drawn out of the feeder 45 by tension due to rotation of the spool 12, while being wound into the cassette shell 10. When a predetermined length of the photographic film 24 is passed through the feeder 45, the spool 12 is stopped from rotating. A cutter incorporated in the supply device of the photographic film is then actuated to cut the photographic film 24. A leader-forming end of the photographic film 24 is then cut out by the cutter into the shape of the leader, at the same time as a trailer-forming end of next strip of photographic film is cut out by the cutter into the shape of the trailer, in which the holes 25 and 26 are further punched.

After the strip of photographic film 24 is cut off, the spool 12 is driven to wind up the photographic film 24 entirely into the cassette shell 10. Upon winding the leader of the photographic film 24 into the cassette shell 10, the spool 12 is stopped. The opener 18 is rotated clockwise, to move the shutter 14 to the blocking position to close the passage port 19. Then the inside of the cassette shell 10 is shielded completely from ambient light. The lever 32 is then retracted to the releasing position. The cassette shell 10 with the photographic film 24 contained is removed from the holder 31, and another empty cassette is supplied thereto. The operation of the loading of a cassette with photographic film is then repeated.

Accordingly, photographic film cassettes can be manufactured with high efficiency despite a somewhat complicated structure of the empty cassette, because of the operation in the steps of: assembling the empty cassette in an illuminated room; retaining the trailer 24a on the spool 12 in a darkroom; and winding the photographic film 24 into the cassette in the darkroom.

Figure 15:
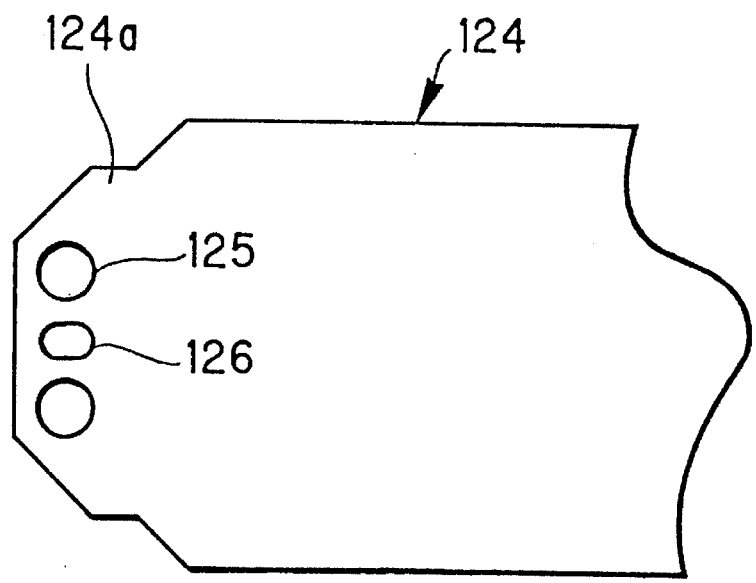
FIG. 15 is an explanatory view illustrating another preferred shape of a trailer.
Figure 16:
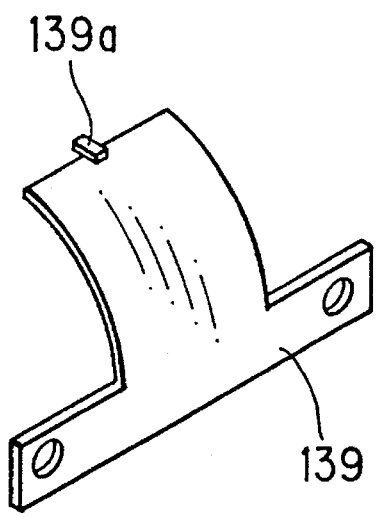
FIG. 16 is an explanatory view illustrating an inserter jig preferable for photographic film having the trailer in FIG. 15.

Note that a novel inserter jig can have one or three or more claws, for picking up the trailer 24a as opposed to two in the preferred embodiment. FIGS. 15 and 16 illustrate photographic film 124 having a trailer 124a, in which a single pick-up hole 126 is formed, with two retaining holes 125. An inserter jig 139 of another embodiment is provided with a single pick-up claw 139a for use with such a trailer 124. If another number of claws are formed on an inserter jig, retaining holes of an equal number can be formed in a trailer of photographic film.

A trailer of photographic film can also be provided with a long single pick-up hole, or slot, for being picked up by a plurality of pick-up claws formed on a spool. Such pick-up claws can be effective if they are so shaped as to move together with the trailer toward the spool without disengagement with the trailer, and as to be disengaged from the trailer to move alone toward the passage port in response to drawing back of the inserter jig or rotation of the spool in the winding direction.

Figure 17:
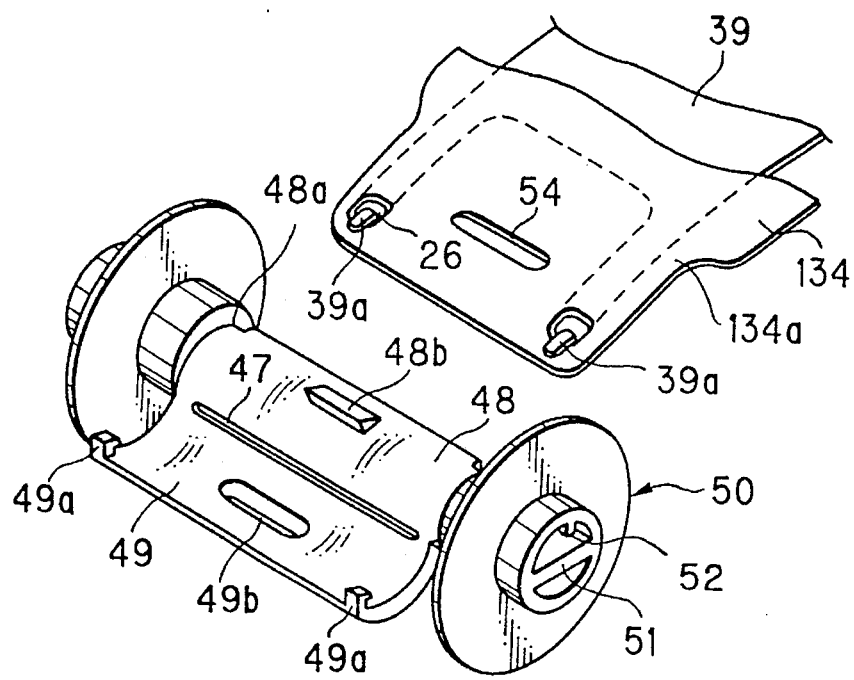
FIG. 17 is a perspective view illustrating the spool of another preferred embodiment.

FIG. 17 illustrates another preferred embodiment in which the spool is constructed differently. Elements similar to those in the above embodiment are designated with identical reference numerals. A spool body 48 is provided with a clamper 49 via a foldably connecting hinge portion 47 of a small thickness, formed integrally. The spool body 48 is provided with a pair of notches 48a, with which hoods 49a on the clamper 49 are engaged when the clamper 49 is folded onto the spool body 48. A long hooking claw 48b is formed integrally with the spool body 48. The inner face of the clamper 49 is provided with a hooking hole 49b, in which the hooking claw 48b is fitted when the clamper 49 is folded on the spool body 48. The end of a spool 50 is provided with a key 51 and a projection 52, which corresponds to the former notch 13a and is adapted to detection by the photo sensor to determine the rotational orientation of the spool 50.

Figure 19:
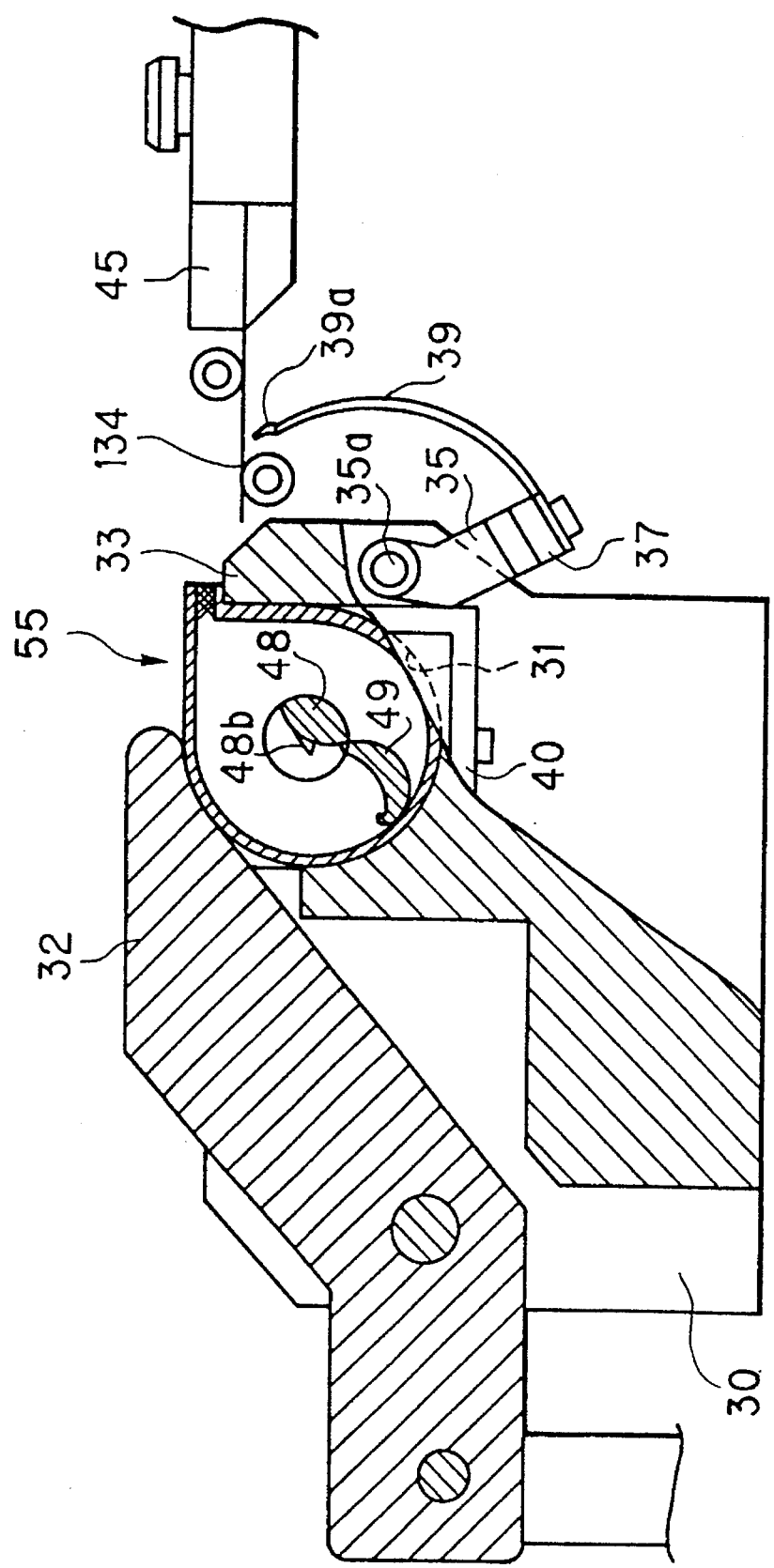
FIG. 19 is an explanatory view illustrating a standby position of the trailer to be retained on a spool.
Figure 20:
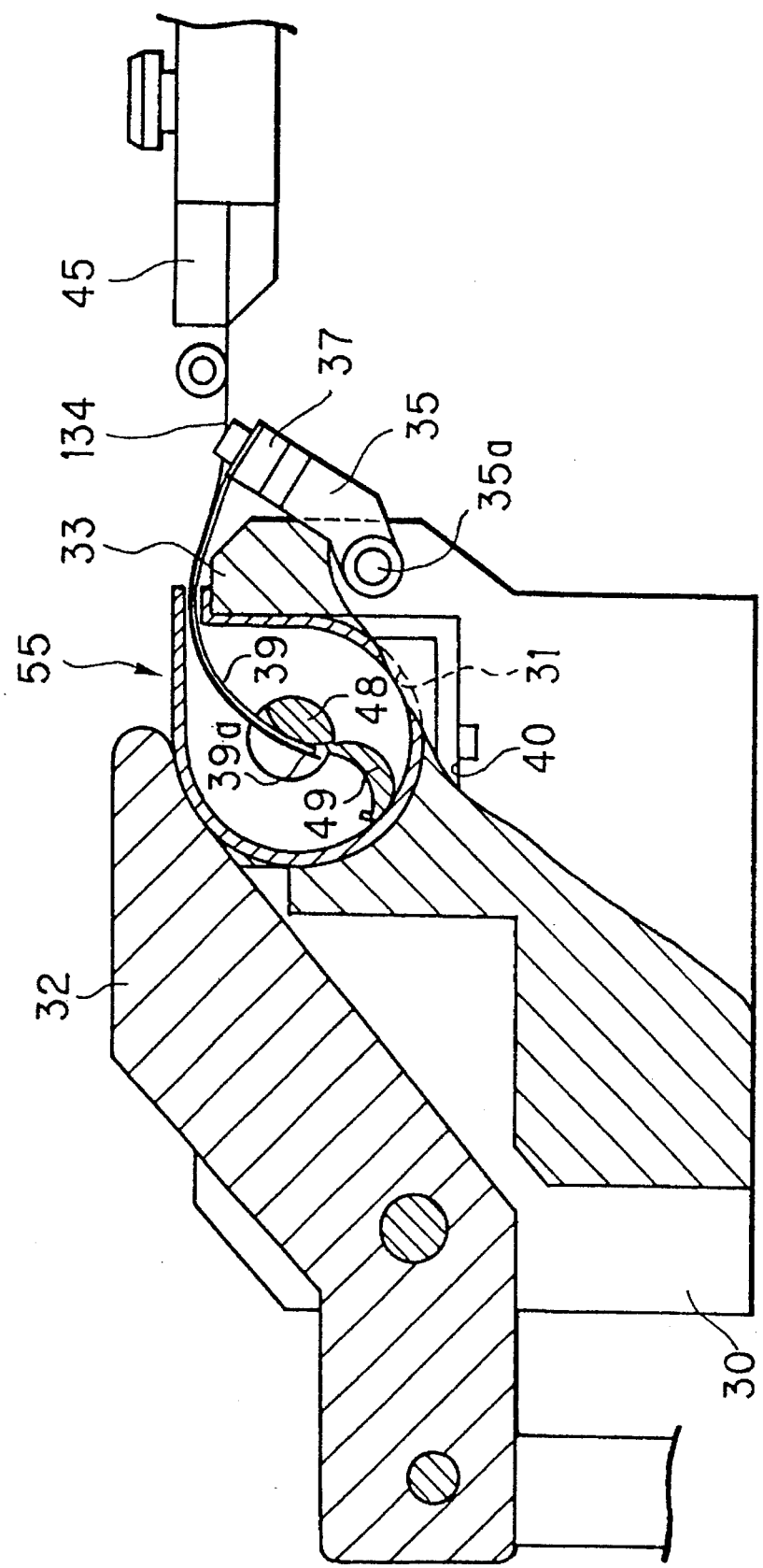
FIG. 20 is an explanatory view illustrating an inserting position of an inserter member, as moved from the standby position in FIG. 19 and inserted into the cassette.
Figure 21:
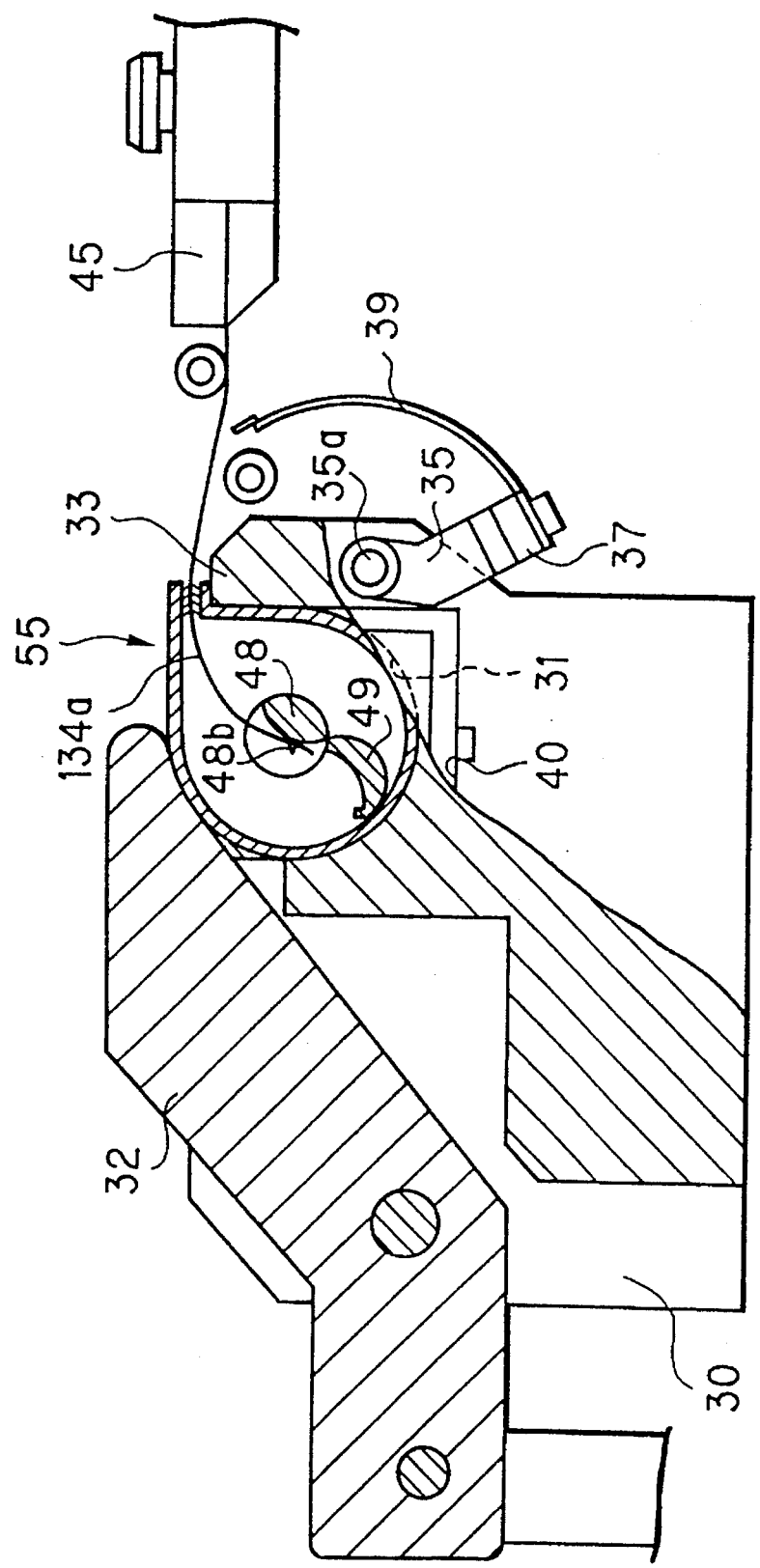
FIG. 21 is an explanatory view illustrating the inserter member standing moved from the inserting position and exited from the cassette.

In correspondence with the spool 50, a trailer 134a of photographic film 134 is provided with the two holes 26 and a hooking hole 54. An empty cassette 55 for containing the photographic film 134 is set in the holder 31 while the inserter jig 39 is in the standby position, as illustrated in FIG. 19. The loading apparatus is then actuated. The trailer 134a is picked up by engagement of the pick-up holes 26 with the claws 39a. The inserter jig 39, as illustrated in FIG. 20, comes into the empty cassette 55, and reaches the spool body 48, until the hooking hole 54 is engaged, with the claw 48b. Then the inserter jig 39 is pulled out of the cassette 55 as illustrated in FIG. 21, without disengagement between the hole 54 and the claw 48b. Note that, for reliable engagement of the hole 54 with the claw 48b, less than one counterclockwise rotation of the spool 50 is effective. While the claws 39a keep the trailer 134a close to the spool body 48, counterclockwise rotation of the claw 48b can easily cause the hole 54 to receive the claw 48b.

Figure 18:
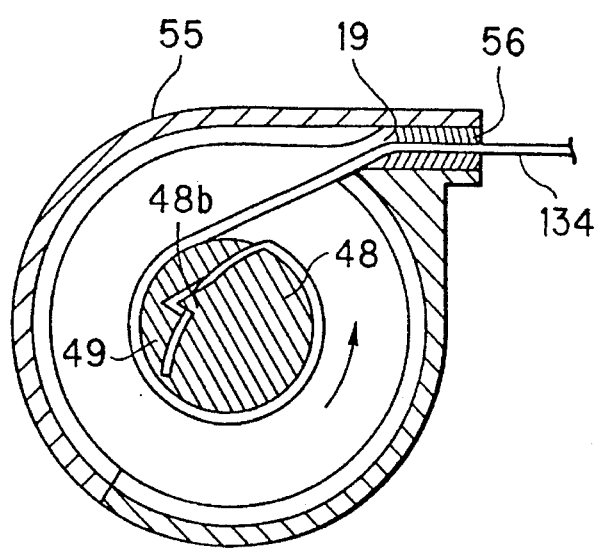
FIG. 18 is a cross section illustrating a cassette incorporating the spool in FIG. 17.
Figure 22:
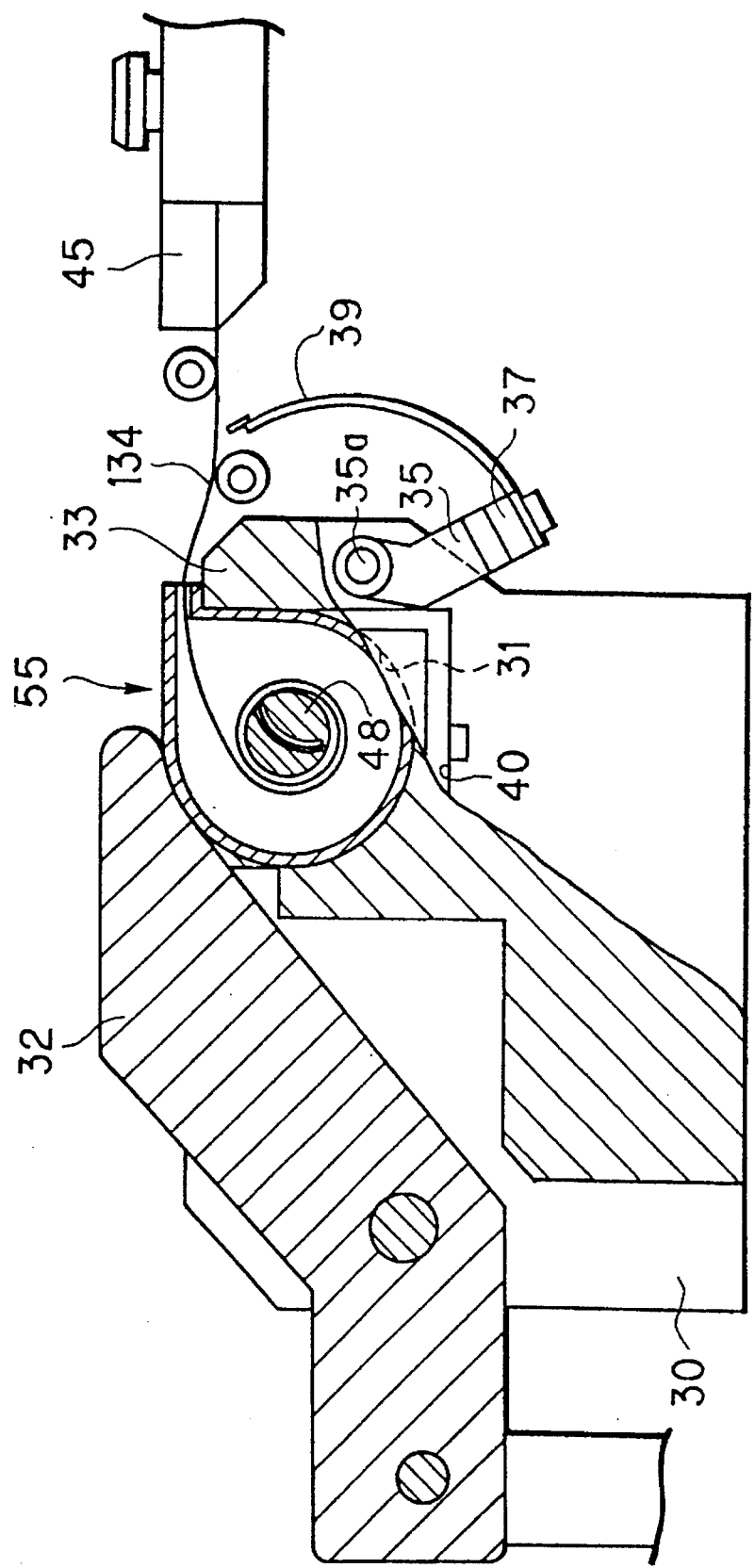
FIG. 22 is an explanatory view illustrating the course of winding the photographic film around the spool.

After the inserter jig 39 is drawn from out of the cassette shell 55, the spool 50 is rotated in the direction of winding the photographic film 134 and the clamper 49 is eventually pressed, by the photographic film 135, against the spool body 48 (see FIG. 22). As illustrated in FIG. 18, the clamper 49 is flexed with respect to the hinge portion 47 and the claw 48b is fitted into the hole 49b. The clamper 49 is rotated together with the spool body 48 as the photographic film 134 is wound ont eh spool 50 as illustrated in FIG. 22. Note that the cassette 55 in FIG. 18 lacks the shutter 14 but has known plush or light-trapping fabric 56 for preventing light from entering the cassette.

Figure 23:
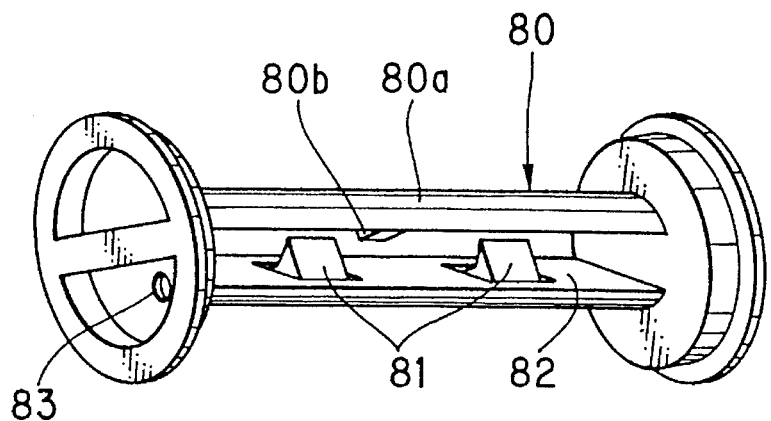
FIG. 23 is a perspective view illustrating a spool of still another preferred embodiment spool.
Figure 26:
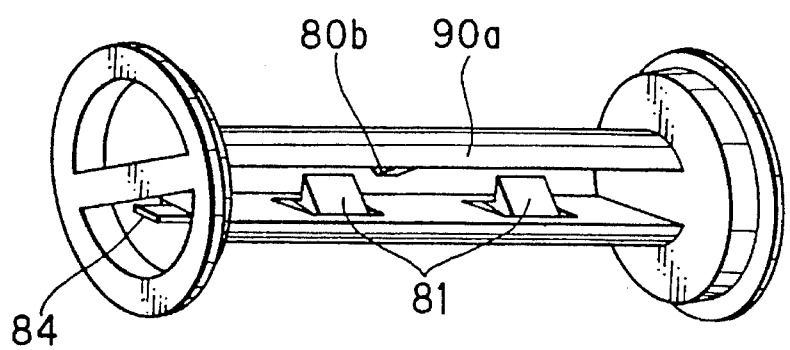
FIGS. 26 and 27 are explanatory views illustrating modifications of the spool in FIG. 23.
Figure 27:
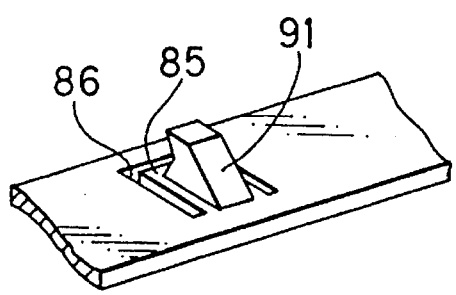
Figure 24:
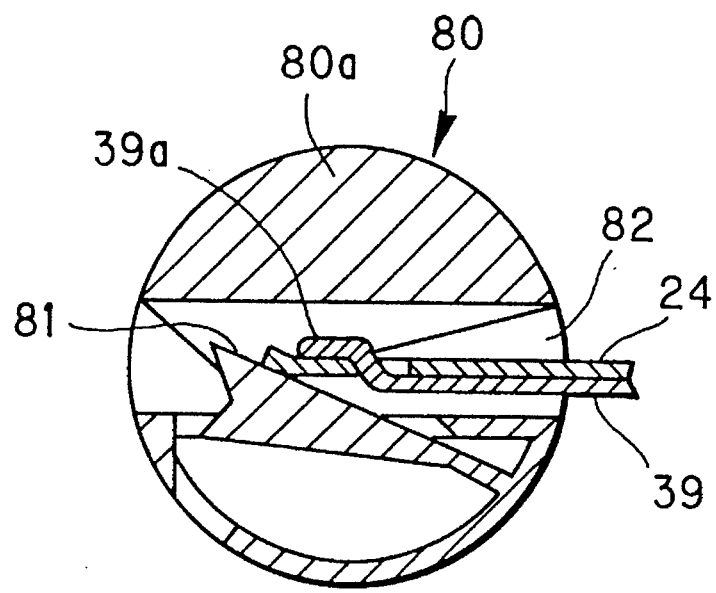
FIGS. 24 and 25 are explanatory views illustrating each retaining claw in the course of deformation.
Figure 25:
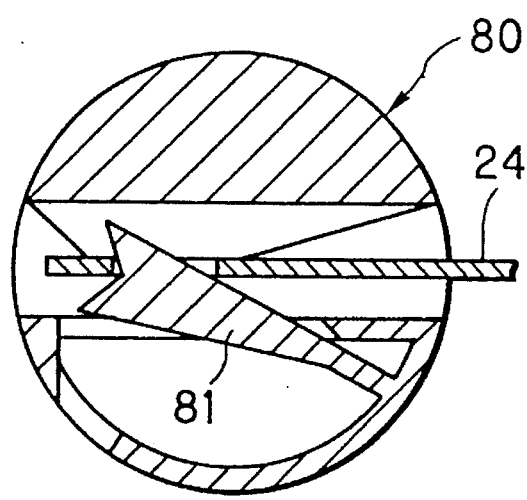

FIG. 23. illustrates another novel spool 80, which is formed from resin, and has retaining claws 81 which are movable up and down due to their resilience. Referenced by 80b are slip-preventive ridges. The retaining claws 81 of the spool 80 are deformed, as illustrated in FIGS. 24 and 25, when the inserter jig 39 with the trailer 24a is inserted into a slot 82 in a core 80a. This deformability facilitates the insertion. The retaining claws 81 recover their original form when the retaining holes 25 in the trailer 24a are engaged with the retaining claws 81. The rotational orientation of the spool 80 is determined by photoelectric detection of a hole 83. Alternatively, a core 90a of the novel spool can have a projection 84 as illustrated in FIG. 26. The projection 84 can be detected by mechanical contact with the photographic film loading apparatus. It is further possible as illustrated in FIG. 27 to form each retaining claw 91 on a cantilever tongue 85 defined by a channel-shaped slit 86, make the claw 91 movable with the tongue 85.

Figure 28:
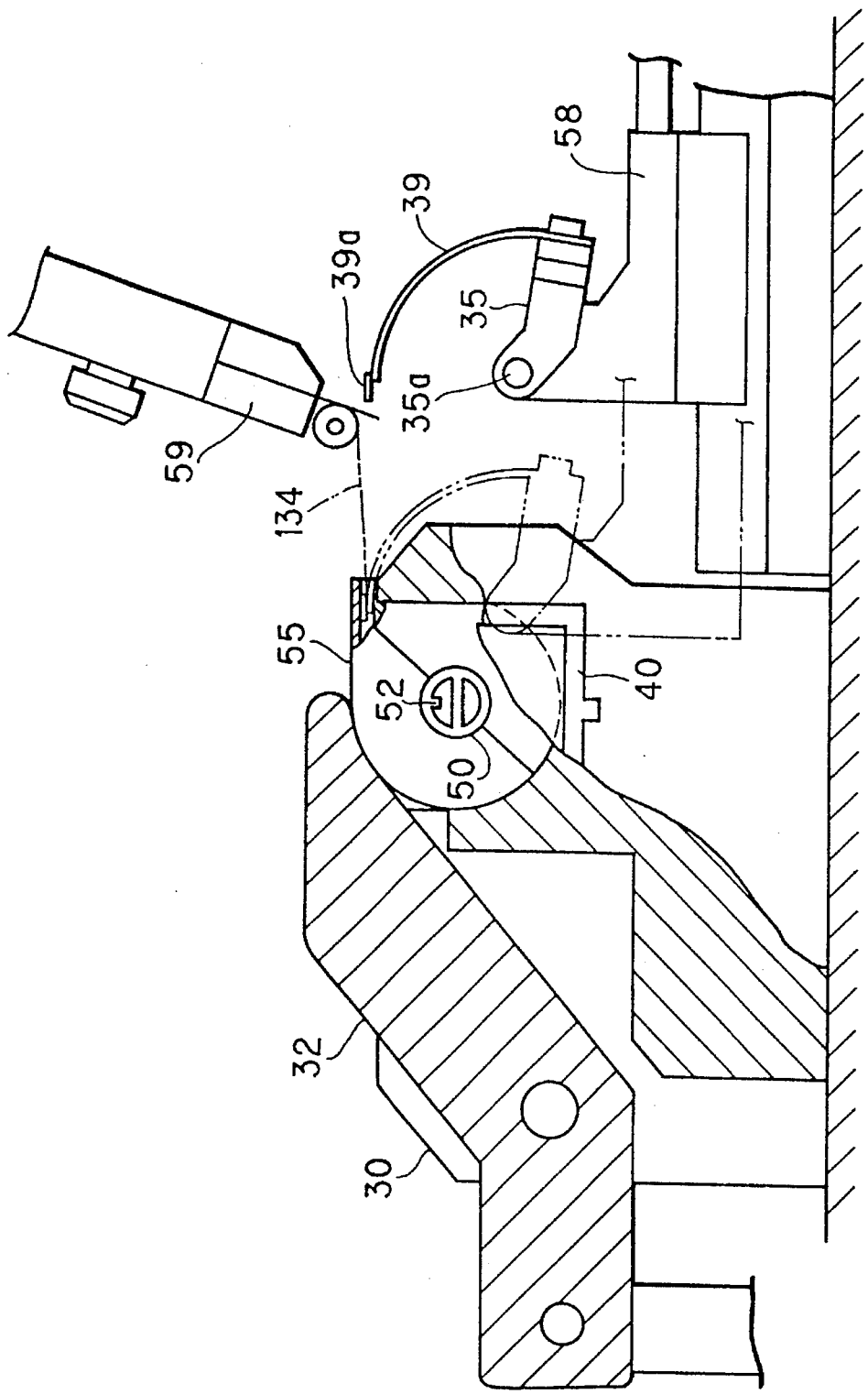
FIG. 28 is an explanatory view illustrating another preferred embodiment for loading photographic film.
Figure 29:
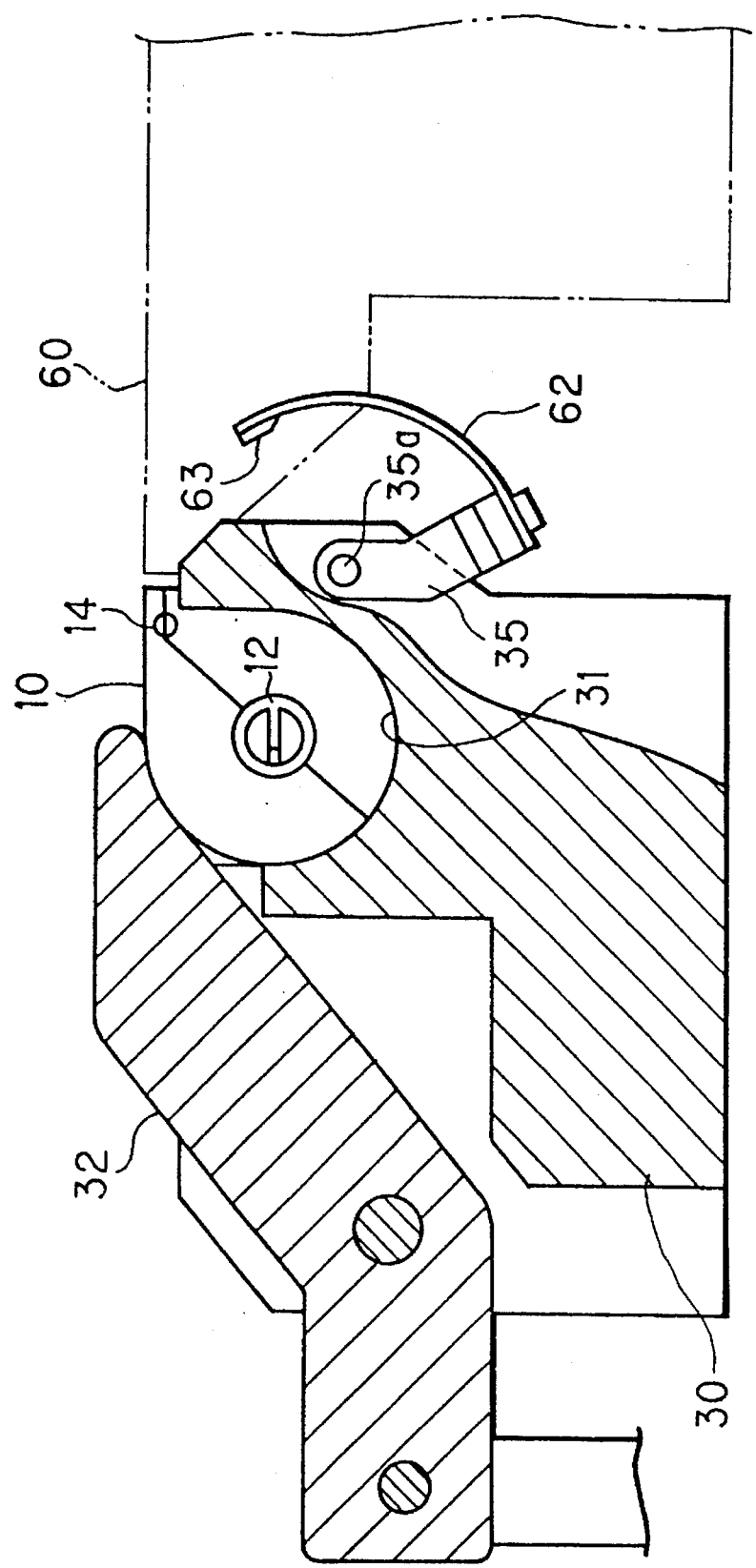
FIG. 29 is a cross section illustrating a preferred embodiment of an apparatus for removing photographic film from the cassette.

FIG. 28 illustrates another preferred embodiment. The arm 35 swingable with the inserter jig 39 is journaled on a slidable unit 58. The photographic film 134 is fed downward from a feeder 59. The photographic film loading apparatus in FIG. 28 is used e.g. for the cassette 55 in FIG. 18. With the cassette 55 properly positioned, the projection 52 is detected photoelectrically, to stop the spool 50 in the predetermined rotational orientation.

The slidable unit 58 is next moved by a hydraulic cylinder (not shown) from the standby position, indicated by the solid line as shown, to the operating position, indicated by the phantom line. The trailer of the photographic film is fed by the feeder 59 and stands by at a position in the path of the pick-up claw 39a. The slidable unit 58 slides to slide horizontally the claws 39a, and fit the claws 39a into pick-up holes formed in the trailer. The insert jig 39 moves horizontally toward the base 30, while drawing the photographic film 134. The slidable unit 58 is stopped in the position of insertion. The shaft 35a of the art 35 is then shifted to the position from which the center of the spool 50 and the passage port 19 are equal distant, namely to the position of the shaft 35a illustrated in FIG. 8.

Operation follows in the manner similar to the former embodiment. The arm 35 is swung through a predetermined angle about the shaft 35a, and swung back to the initial inserting position. The trailer 134a is mounted on the spool body 48 of the spool 50 by hooking the claw 48b on the hole 54. Then the inserter jig 39 is drawn out of the cassette 55. The slidable unit 58 is then retracted to the standby position. The spool 50 is driven to rotate in the winding direction of the photographic film 134. The photographic film 134 is thus wound up into the cassette 55, while being drawn out of the feeder 59.

This photographic film loading apparatus incorporating the slidable unit 58 is naturally applicable not only to the cassette 55 in FIGS. 17 and 18 but also to the cassette 10 in FIGS. 1 to 4. Note that, though the present loading apparatus differs from the former in movement of the inserter jig 39, the former in arcuate fashion and the latter in linear and arcuate directions, the inserter jig 39 can be moved along other appropriate paths. For example, the inserter jig 39 can be moved, first in straight fashion to the passage port 19, secondly in arcuate fashion from the passage port 19 to the slot 20, and thirdly in straight fashion within the slot 20. Such a path makes it possible to reduce damage to the photographic film 24 and the shutter 14 while retaining trailer 24a of the photographic film 24 on the spool 12.

Accordingly, the use of the novel loading apparatus can completely automate the processes of loading the cassette with the photographic film. The photographic film cassette can be produced with great efficiency, because the empty cassette with the spool can be manufactured in an illuminated room.

FIGS. 29–36 illustrate an apparatus for removing exposed photographic film 144. This apparatus is applied in a photo laboratory, and usable both in the darkroom and an illuminated room, with a cover for shielding the inside from ambient light. Fundamental construction of the removing apparatus is similar to the loading apparatus in FIG. 7. Elements the same as those of the former apparatus are designated with identical reference numerals. A photographic film drawing device 60 is connected to a developing apparatus. The drawing device 60 draws the exposed photographic film 144 (see FIGS. 34–36) exited from the cassette shell 10, to convey the photographic film 144 automatically to the developing apparatus.

Figure 30:
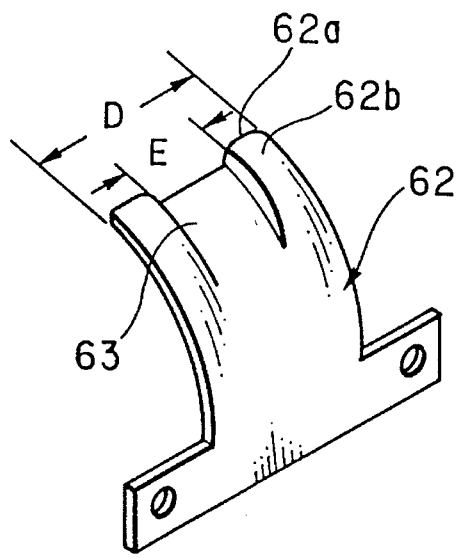
FIG. 30 is a perspective view illustrating a separator jig for use in the apparatus in FIG. 29.

The two arms 35 are provided with a separator jig 62 attached thereto. The separator jig 62 is arcuate, is formed of flexible thin metal, and is provided with a central lowered portion 63 on a front edge 62a, as illustrated in FIG. 30. The front edge 62a is shaped to correspond to the spool 12 illustrated in FIGS. 2 and 3. The general width D of the separator jig 62 is greater than interval between the two retaining claws 21. The width E of the lowered portion 63 is greater than the interval between the preventive ridges 22.

With all the photographic film wound and contained within the cassette shell 10, the cassette shell 10 is set in the holder 31. Then the opener 18 rotates the shutter 14 to open the passage port 19. The fork 41a drives the spool 12 in the direction of advancement of the photographic film 144. The roll of the exposed photographic film 144 is then rotated together with the spool 12. The leading edge of the photographic film 144 abuts on, and is separated by, the separator claw 17, and is directed into the passage port 19. With the spool 12 driven, a leader of the photographic film 144 is exited from the cassette shell 10, and is guided into the drawing device 60.

The photographic film 144 is advanced into the drawing device 60 to a predetermined length. A drawing mechanism in the drawing device 60 is then actuated to draw the photographic film 144 from the cassette shell 10. The drive unit 41 does not further drive the fork 41a. The photographic film 144 is advanced into the drawing device 60 by being drawn. Nearly all the exposed photographic film 144 is drawn out of the cassette shell 10. As a trailer 144a of the photographic film 144 stands retained on the core 12b of the spool 12, the photographic film 144 resists being drawn out. The drawing device 60 incorporates a tension meter, which checks the tension of the photographic film 144 and detects the state where nearly all the exposed photographic film is drawn out by an increase in tension of the film. Upon this detection, the drawing device 60 is moved slidingly to the right in FIG. 29 to be apart from the base 30.

Figure 34:
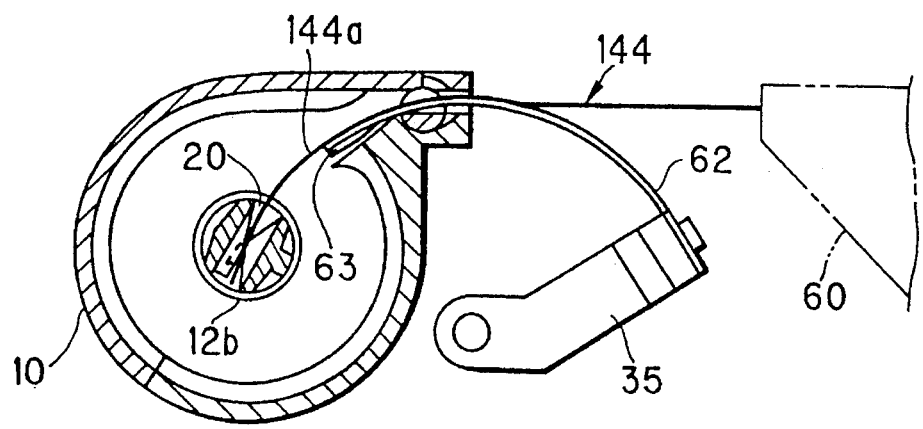
FIGS. 34 to 36 are explanatory views illustrating operation of the apparatus in FIG. 29.
Figure 35:
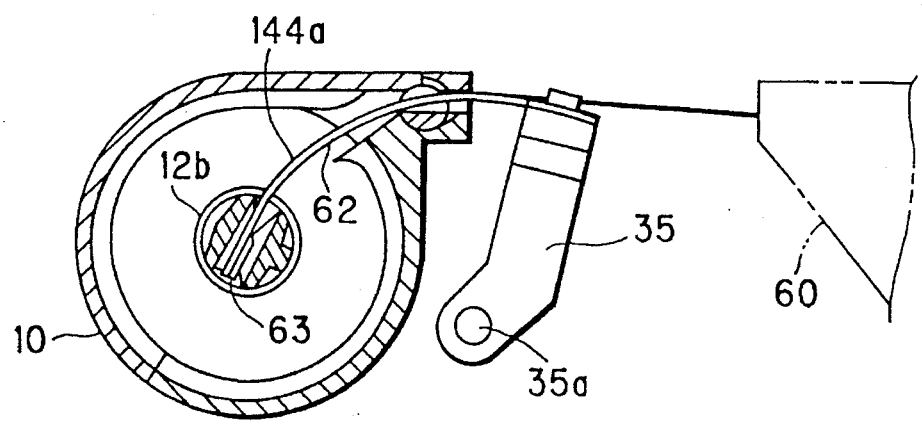

The arms 35 are rotated as illustrated in FIG. 34. The front edge 62a of the separator jig 62 is entered into the passage port 19 in the cassette shell 10, along the emulsion surface of the photographic film 144, arranged on the bottom side as viewed in the drawings. While tension is applied to the photographic film 144, the slot 20 in the spool 12 is directed to the passage port 19. The front edge 62a of the separator jig 62 enters the slot 20 as illustrated in FIG. 35. Note that photoelectric detection of the notch 13a on the photo sensor 42 may be used for the purpose of checking the rotational orientation of the slot.

Figure 37:
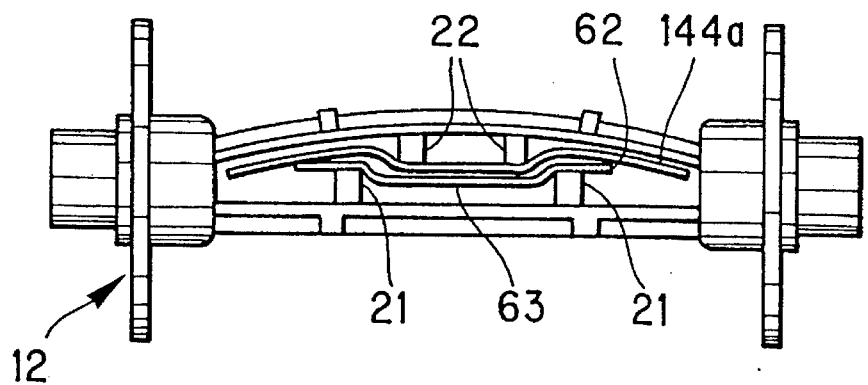
FIG. 37 is a front elevation illustrating a spool in the course of separation of the trailer.
Figure 38:
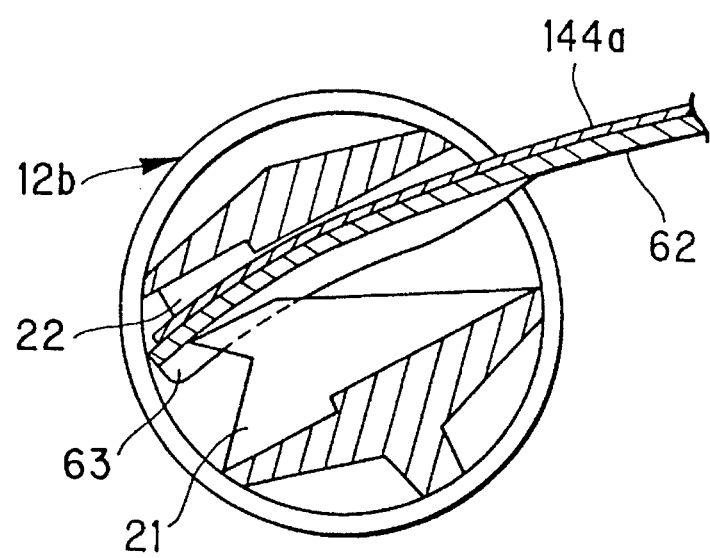
FIG. 38 is a cross section illustrating the spool in the course of separation of the trailer.
Figure 39:
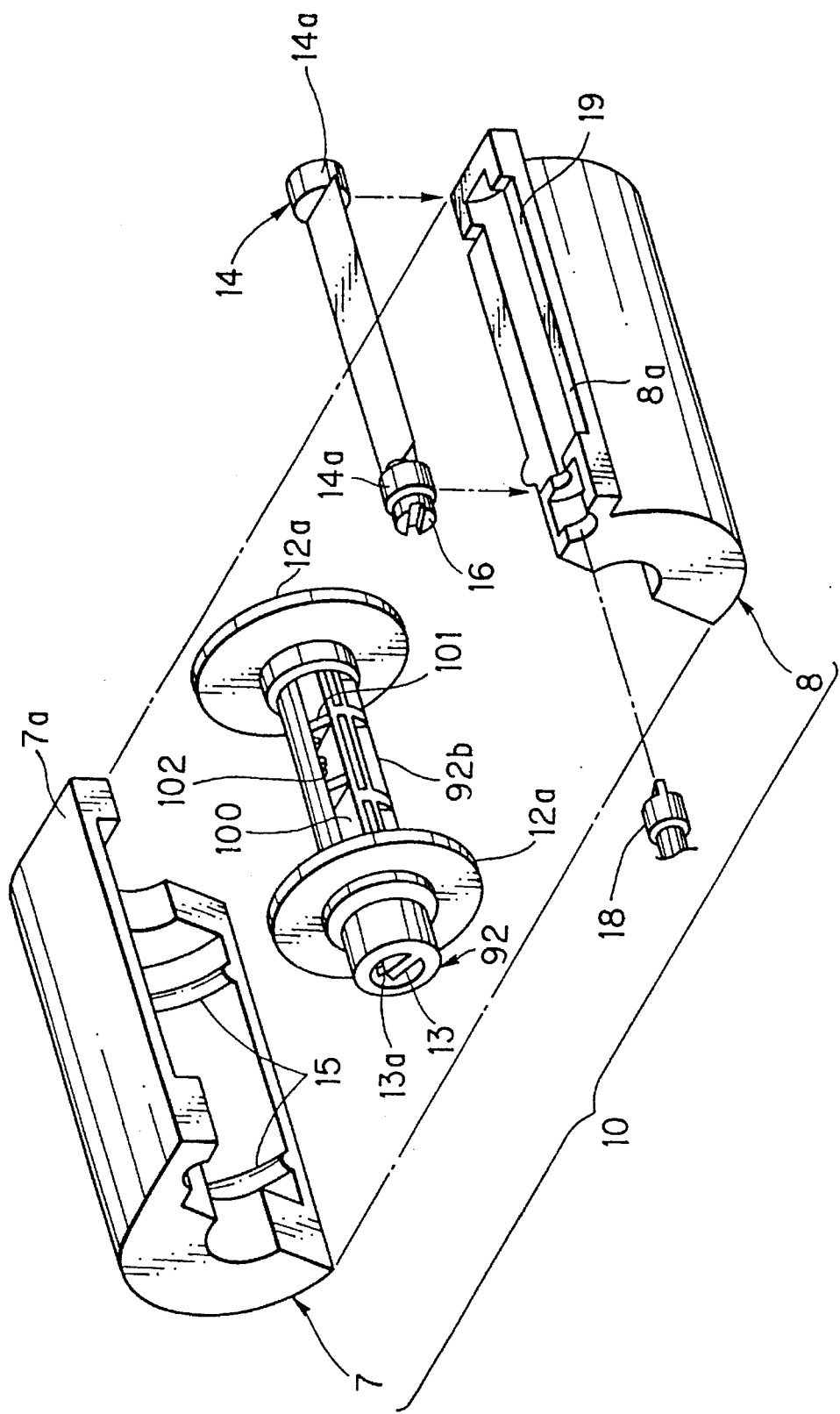
FIG. 39 is an exploded perspective view illustrating another preferred embodiment of the cassette in which a slot for receiving a trailer in the spool is off-center.

FIGS. 37 and 38 illustrate the front end of the separator jig 62 when it is passed into the slot 20. The preventive ridges 22 on the upside of the slot 20 abut on the lowered portion 63 of the separator jig 62. Lateral raised portions 62b press the upside of the slot 20 upward, to deform the core 12b in a curved manner as illustrated in FIG. 37. The raised portions 62b, ride on the retaining claws 21, are inserted between the photographic film 144 and the retaining claws 21, and disengage the retaining holes 25 from the claws 21, until the trailer 144a is released from retention on the spool 12. Note that entry of the separator jig 62 into the cassette shell 10 is facilitated when the photographic film 144 is substantially unwound so that only one convolution or less remains wound on the spool 12. This is because, though the separator jig 62 is not directed to the slot 20 initially, the emulsion surface of the photographic film 144 is in contact with the separator jig 62, and guides it to the entrance of the slot 20 while one convolution or less is wound on the spool. The emulsion surface of the photographic film 144 could be scratched by the separator jig 62. However such scratches does not influence the image quality, because the separator jig 62 comes in contact only with the trailer 144a where no images are recorded.

Figure 36:
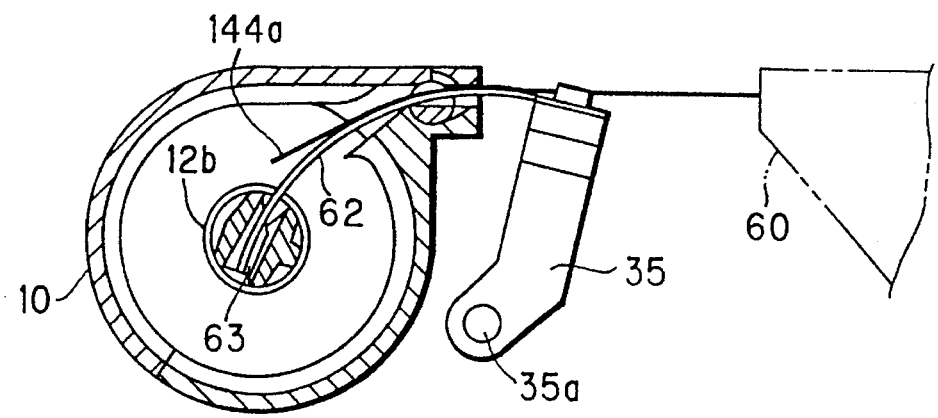

The arm 35 is temporarily stopped from rotation. The drawing mechanism in the drawing device 60 is actuated to draw the photographic film 144. Because trailer has been released from retention on the spool 12, the photographic film 144 is easily drawn and removed from the spool 12 as illustrated in FIG. 36, until the photographic film 144 is fully drawn into the drawing device 60. The arm 35 is then rotated in reverse, and returned to the home position indicated by the solid line in FIG. 29. The drawing device 60 again comes close to the base 30, and stands by for processing of another cassette containing exposed photographic film.

Figure 31:
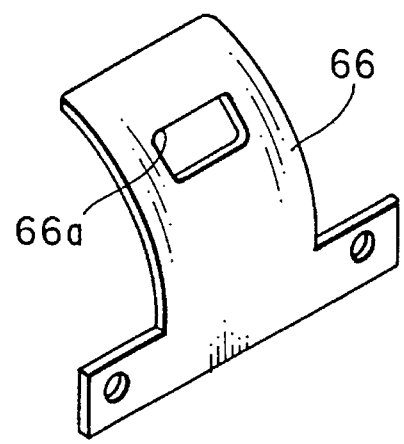
FIGS. 31 to 33 are perspective views illustrating other preferred embodiments of the separator jig.
Figure 32:
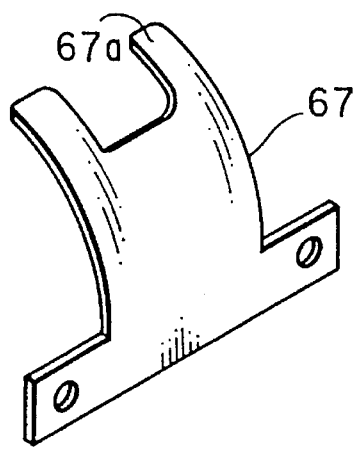
Figure 33:
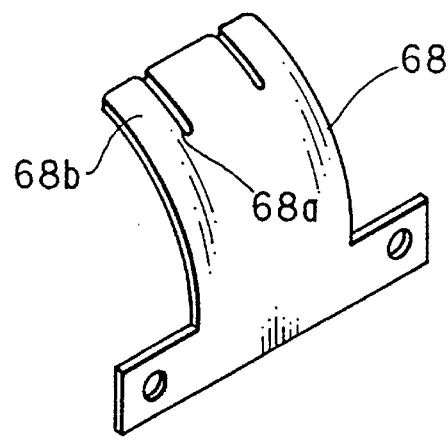

The use of the novel photographic film removing apparatus thus makes it possible with ease to remove the trailer from the spool 12, without any disassembly of the cassette shell 10. If the inserting apparatus in FIGS. 5 to 7 is used in addition to the removing apparatus, it is conceivable to immediately reuse the use cassette shell which has been emptied by the removing apparatus. Novel separator jigs can be alternatively formed in the shapes as illustrated in FIGS. 31, 32 and 33. In FIG. 31, a separator jig 66 has a flat front edge. When thrust into the slot 20, the widthwise central portion is bent and lowered by the preventive ridges 22 for smooth entry into the slot 20, while assisted by an opening 66. The opening 66 is also helpful, when a passage port is constructed with a plush or light-trapping fabric, to incline the pile threads of the plush toward the outside of the cassette.

In FIG. 32, a separator jig 67 is provided with a central recess defining a pair of lateral projections 67a, which are adapted to contact with the claws 21 and disengage the holes 25 therefrom. In FIG. 33, a separator jig 68 is provided with two grooves 68a beside which a pair of flaps 68b are defined. The central portion is easily deformable in contact with the preventive ridges 22. All the separator jigs 66 and 68 can also be attached to the arms 35 in FIG. 29. With any of the various separator jigs, the path for movement can be determined appropriately in view of unfailing entry of the jigs into the slot formed in the spool. The cassette to be processed with the novel removing apparatus can preferably be those illustrated in FIG. 23 to 27 because the retaining claws can be deformed with greater ease.

In the above embodiments, the operation of entering the inserter jig or separator jig into the slot in the spool requires substantial force, which may irrecoverably deform the jigs. Also, the radius of curvature of the inserter jig or separator jig may be so small that the jig rubs and damages the inside of the passage port. In the case of a cassette shell having the plush, the threads may be so erected as to hinder the photographic film from passing through the passage port. FIGS. 39 to 42 illustrate an embodiment in which a radius of curvature of an inserter jig is enlarged, in order to reduce resistance in entry of the jig into the slot and to maintain adequate spatial allowance for passage through the passage port. Elements the same as those of the former apparatus are designated with identical reference numerals.

The cassette shell 10 contains a novel spool 92, appropriate for winding photographic film 94 (see FIG. 41) of a somewhat long strip, namely the recording a large amount of picture frames, e.g., as many as 36 to 40 exposures. The diameter across a core 92b of the spool 92 is in the range of 5 to 10 mm, small enough to allow the somewhat many convolutions of the photographic film 94 to be wound thereon.

Figure 40:
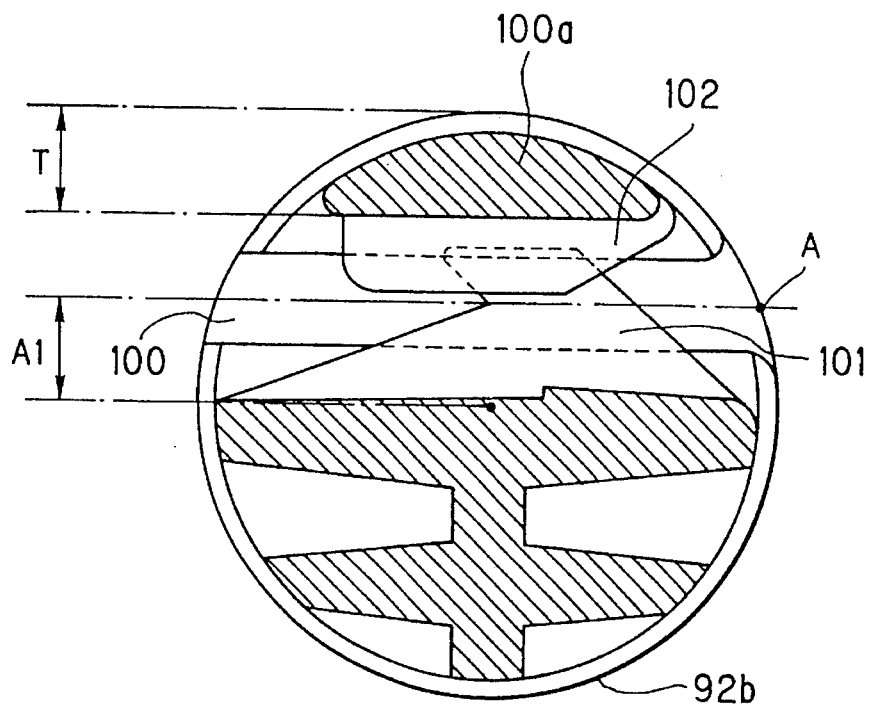
FIG. 40 is a cross section illustrating the spool in FIG. 39.
Figure 41:
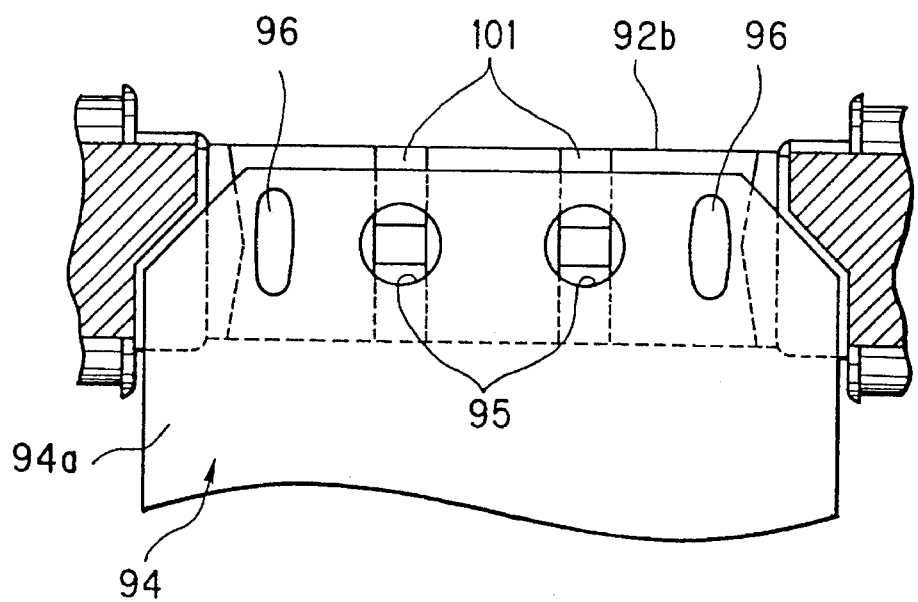
FIG. 41 is an explanatory view illustrating a construction for retaining the trailer on the spool in the cassette in FIG. 39.

A slot 100 is formed in the core 92b so that a center line of the slot 100, namely the line equally distant from two walls of the slot 100, does not coincide with (i.e., is offset from) the rotational axis of the spool 92. As illustrated in FIGS. 40 and 41, let A1 be an interval between the center line of the slot 100 and the axis of the spool 92. A1 is for example in the range of 0.3 to 4 mm. Let T be the thickness of a thinner wall 100a of the slot 92 which is thinner than the opposite wall and is provided with slip-preventive ridges 102. To facilitate the deformation of the thinner wall 100a, T should be in the range of 0.3 to 1.5 mm, more preferably 0.8 to 1.2

It is also noted that intersection between retaining claws 101 and the preventive ridges 102 does not lie on the rotational axis of the spool 92. A novel apparatus for loading photographic film into the cassette having the spool 92 is provided with an inserter jig 109, of which an arcuate shape has a somewhat great radius of curvature, for example in the range of 18 to 30 mm (see FIG. 42).

Figure 42:
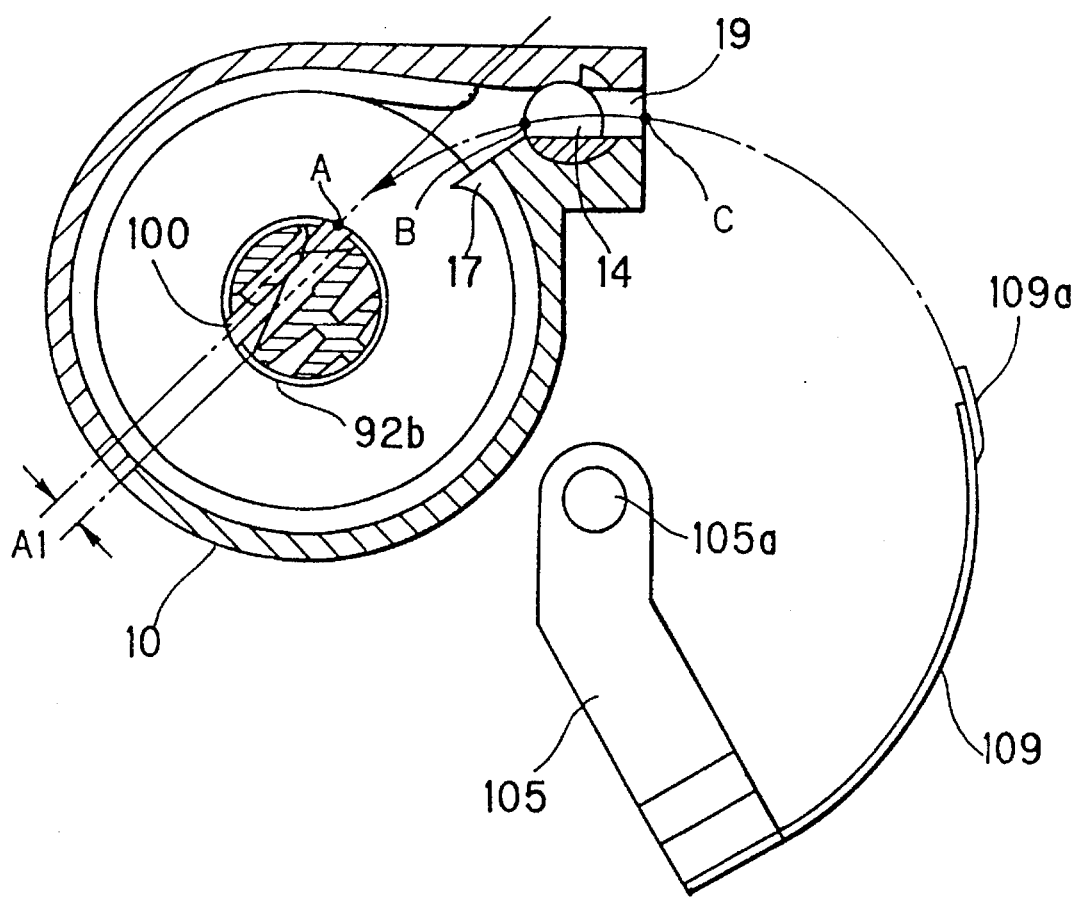
FIG. 42 is an explanatory view illustrating the trailer in the course of retention on the spool in the cassette in FIG. 39.

FIG. 42 illustrates a relationship between the cassette shell 10 and a jig arm 105 while the cassette shell 10 stands positioned by the holder 31 and the edge 33 in the predetermined orientation. Point A is the intersection of the center line of the slot 100 and the core 92b. Point B lies in the innermost position of the passage port 19 and equally distant from the port walls of the passage port 19. Point C lines in the outermost position of the passage port 19 and equally distant to the port walls. The arcuate shape of the inserter jig 109 and thus the path of each pick-up claw 109a lie on a circle on which Points A, B and C lie. The inserter jig 109 with the pick-up claws 109a passes substantially a course which is equal distant from the port walls of the passage port 19.

Because the thinner wall 100a of the slot 100 in the core 92b desirable is only as thick as 0.8 to 1.2 mm, the thinner wall 100a is so easily deformed that resistance to entry of the inserter jig 109 is in the range of only 300 to 700 gf. This is substantially low resistance as compared with the former spools, in which the slot coincides with the rotational axis, which have high resistance to entry of the inserter jig ranging from 800 to 1000 gf. The core 92b does not deform the pick-up claws 109a irrecoverably.

Note that, to load the cassette shell 10 with the photographic film 94, the spool 12 is stopped for receiving a trailer 94a into the slot 100 at a position illustrated in FIG. 42, namely in the orientation where Point A is in the arcuate path of the claws 109a. In rotating the arm 105, the claws 109a pick up pick-up holes 96 in the trailer 94a and pass Points B and C within the passage port 19 to enter the cassette shell 10. The thinner wall 100a with the preventive ridges 102 is omitted from FIG. 41, for convenience in showing the trailer 94a with the core 92b.

Figure 43:
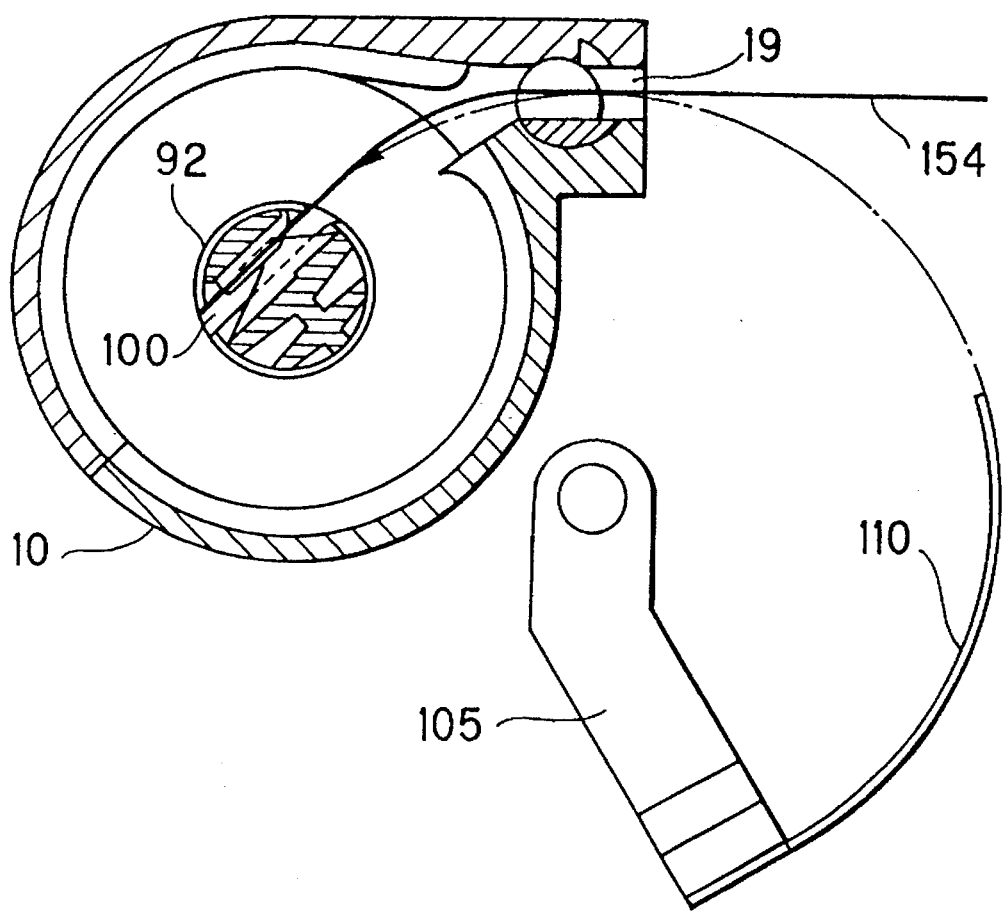
FIG. 43 is an explanatory view illustrating a trailer in the course of separation from the spool in the cassette in FIG. 39.

FIG. 43 illustrates a photographic film removing apparatus appropriate for the cassette shell 10 containing the novel spool 92. Elements the same as those of the former apparatus is designated with identical reference numerals. A separator jig 110 is passed between the retaining claws 101 and exposed photographic film 154. The retaining holes 95 are disengaged from the retaining claws, to release the trailer 14 from retention on the slot 100.

Note that, when the present invention is applied to a cassette as disclosed in U.S. Pat. No. 4,834,306 in which a spool has a pair of flanges with circumferential lips, it is desirable to prevent the jigs from coming in contact with the flanges, by setting the width of the inserter jig 109 and the separator jig 110 to be smaller than the interval defined between the two lips on the flanges.

Note that, when the present invention is applied to a cassette as disclosed in U.S. Pat. No. 4,834,306 in which a spool has a pair of flanges with circumferential lips, it is desirable to prevent the jigs from coming in contact with the flanges, by setting the width of the inserter jig 109 and the separator jig 110 to be smaller than the interval defined between the two lips on the flanges.

Figure 44:
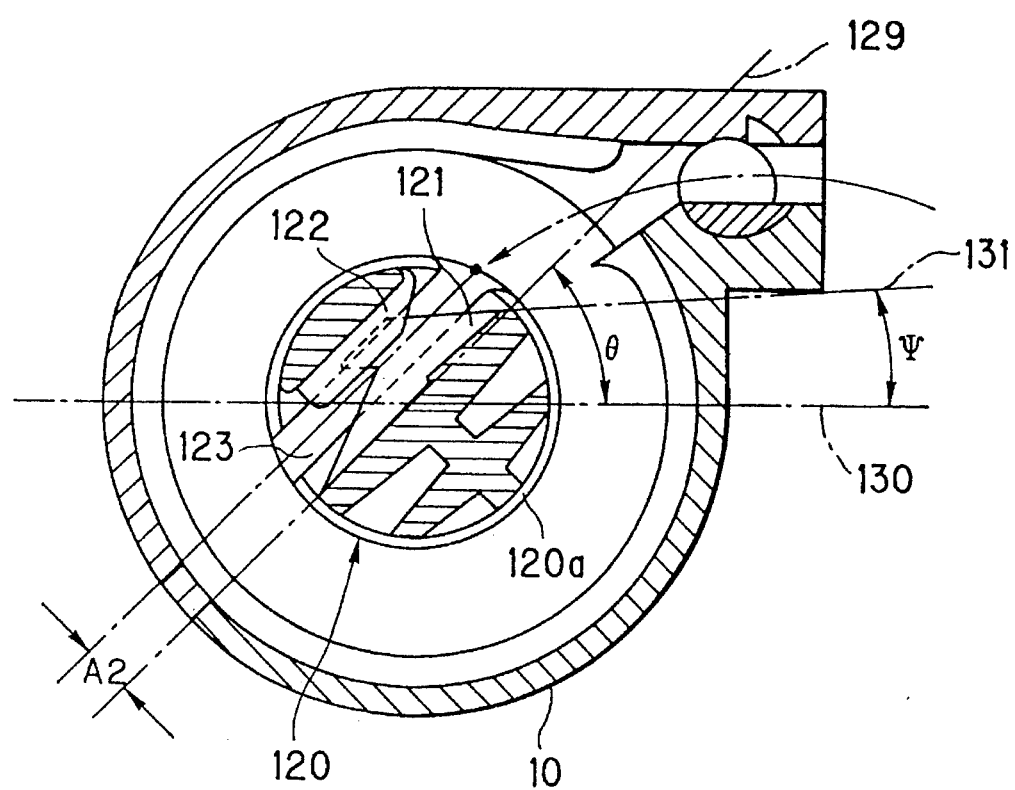
FIG. 44 is a cross section illustrating another preferred embodiment of the cassette in which a core of a spool has a greater diameter.

FIG. 44 illustrates a cassette containing another novel spool 120, appropriate for winding photographic film of a shorter strip, namely for recording fewer picture frames, e.g., as many as 10 to 28 exposures. The diameter across a core 120b of the spool 120 is in the range of 11 to 13 mm, greater than that of the former embodiments, to correspond to the fewer convolutions of the photographic film as wound.

Let A2 be an interval between the center line of a slot 123 and the axis of the spool 120. It is desirable that A2 be equal to or below A1 of the above embodiment. Let θ be an angle between a horizontal line 130 and a line 129, namely an angle between the course of the passage port 19 and the direction of the slot 123 as oriented for receiving the trailer. It is desirable that θ be equal to or greater than a counterpart associated with the spool 92 of the previous embodiments. Let ψ be an angle between the horizontal line 130 and a line 131 along which retaining claws 121 are inclined for coming in gentle contact with the trailer. It is desirable that ψ be substantially equal to a counterpart associated with the spool 92 of the previous embodiment. Slip-preventive ridges 122 are also provided.

The present invention is applicable to loading photographic film of a shorter strip into a cassette provided with a spool which is suitable for fewer convolutions, or loading photographic film of a longer strip into a cassette provided with the spool which is suitable for the more convolutions.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention as defined by the appended claims, they should be construed as included therein.

What is claimed is:

1. A photographic film cassette in which photographic film is completely contained in a cassette shell, a trailer of said photographic film is attached on a core of said spool, and rotation of said spool in an unwinding direction exits said photographic film to an outside of said cassette shell, said photographic film cassette comprising:

at least one retaining hole formed in said trailer;

a slot formed in said core of said spool and extending in an axial direction of said spool for receiving said trailer, said slot dividing said core into first and second portions;

at least one retaining claw projecting from a surface of said first portion into said slot so as to be fitted on said retaining hole, thereby retaining said trailer on said spool; and at least one preventive projection, projecting from a surface of said second portion into said slot in opposition to said retaining claw, for preventing said retaining hole from slipping away from said retaining claw;

a center of said slot being offset from a rotational axis of said spool and said second portion having a thickness in the range of 0.3 mm to 1.5 mm.

2. A photographic film cassette as recited in claim 1, wherein pickup holes are formed in said trailer.

* * * * *